US008370588B2

(12) United States Patent
Nakajima et al.

(10) Patent No.: US 8,370,588 B2
(45) Date of Patent: Feb. 5, 2013

(54) COMPUTER SYSTEM CONTROL METHOD AND COMPUTER SYSTEM

(75) Inventors: Akio Nakajima, Kawasaki (JP); Akira Fujibayashi, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 204 days.

(21) Appl. No.: 12/935,762

(22) PCT Filed: Sep. 9, 2010

(86) PCT No.: PCT/JP2010/005512
§ 371 (c)(1),
(2), (4) Date: Sep. 30, 2010

(87) PCT Pub. No.: WO2012/032576
PCT Pub. Date: Mar. 15, 2012

(65) Prior Publication Data
US 2012/0066468 A1   Mar. 15, 2012

(51) Int. Cl.
*G06F 12/00* (2006.01)
*G06F 11/00* (2006.01)
(52) U.S. Cl. ........ 711/161; 370/217; 711/162; 711/165; 711/E12.001
(58) Field of Classification Search ........... 709/217; 711/161, 162, 165, E12.001; 370/217
See application file for complete search history.

(56) References Cited

U.S. PATENT DOCUMENTS

| 7,484,059 | B1 | 1/2009 | Ofer et al. | |
|---|---|---|---|---|
| 7,779,218 | B2* | 8/2010 | Fandel et al. | 711/162 |
| 2003/0187945 | A1* | 10/2003 | Lubbers et al. | 709/213 |
| 2006/0034302 | A1 | 2/2006 | Peterson | |
| 2006/0248297 | A1* | 11/2006 | Watanabe et al. | 711/162 |
| 2007/0263637 | A1 | 11/2007 | Madnani et al. | |
| 2008/0005507 | A1 | 1/2008 | Madnani et al. | |
| 2009/0025007 | A1* | 1/2009 | Hara et al. | 718/105 |
| 2009/0276594 | A1* | 11/2009 | Fujii et al. | 711/162 |

FOREIGN PATENT DOCUMENTS

EP   1130514 A2   9/2001

OTHER PUBLICATIONS

INCITS, "Fibre-Channel, Inter-Fabric Routing (FC-IFR), Rev. 1.06" (INCITS Working Draft Proposed) American National Standard For Information Technology, New York, NY, May 12, 2010.
International Search Report and Written Opinion for Application No. PCT/JP10/005512, dated May 30, 2011.

* cited by examiner

*Primary Examiner* — Yaima Campos
*Assistant Examiner* — Mehdi Namazi
(74) *Attorney, Agent, or Firm* — Volpe And Koenig, P.C.

(57) ABSTRACT

A host computer is coupled to a first fabric, a source storage apparatus is coupled to a second fabric, and a destination storage apparatus is coupled to a third fabric. A destination port of the destination storage apparatus comprises a same WWPN as a WWPN of a source port, and is logged in to the fabric beforehand. Duplicate WWPNs are allowed to exist because an inter fabric router separately manages the second fabric and the third fabric. When a switchover is instructed, the inter fabric router switches a coupling destination of the host computer to the destination storage apparatus.

15 Claims, 27 Drawing Sheets

Fig. 3

| N_Port | N_Port ID (F_ID, NPID) | pointer to N_Port (F_ID, NPID) | World Wide Port Name (WWPN) | Path Selection Pair ID & state |
|---|---|---|---|---|
| N_Port A 6 (Host) | F_ID = F_A NPID = FA_A | (N/A) | WWPN_A | (N/A) |
| Persistent Proxy N_Port 22 | F_ID = F_A NPID = FA_PS | F_ID = F_B NPID = FB_B | WWPN_S | Pair_ID = 1 Select F_B |

Figure 3a

| N_Port | N_Port ID (NPID) | pointer to N_Port ID (F_ID, NPID) | World Wide Port Name (WWPN) | Path Selection Pair ID & state |
|---|---|---|---|---|
| N_Port B 8 (Src Storage) | F_ID = F_B NPID = FB_B | (N/A) | WWPN_S | (N/A) |
| Proxy N_Port A 23 | F_ID = F_B NPID = FB_PA | F_ID = F_A NPID = FA_A | WWPN_A | Pair_ID = 1 Select F_B |

Figure 3b

| N_Port | Proxy N_Port (NPID) | pointer to N_Port ID (F_ID, NPID) | World Wide Port Name (WWPN) | Path Selection Pair ID & state |
|---|---|---|---|---|
| N_Port C 10 (Dest Storage) | F_ID = F_C NPID = FC_C | (N/A) | WWPN_S (same as old storage's WWPN) | (N/A) |
| Proxy N_Port A 24 | F_ID = F_C NPID = FC_PA | F_ID = F_A NPID = FA_A | WWPN_A | Pair_ID = 1 (Not Select) |

Figure 3c

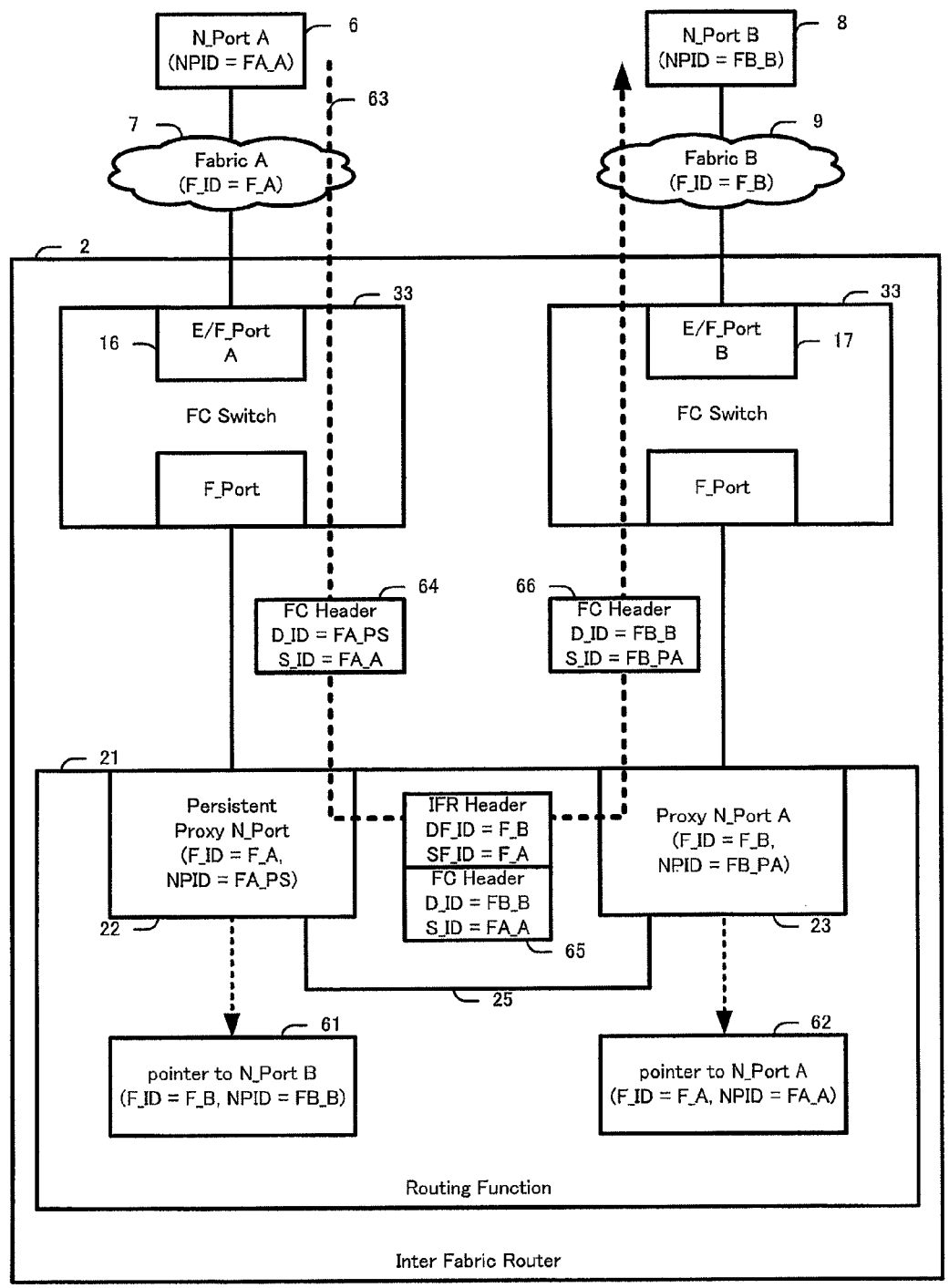

Fig. 8

| N_Port (41) | N_Port ID (F_ID, NPID) (42) | pointer to N_Port (F_ID, NPID) (43) | World Wide Port Name (WWPN) (44) | Path Selection Pair ID (45) |
|---|---|---|---|---|
| N_Port A 6 (Host) | F_ID = F_A NPID = FA_A | (N/A) | WWPN_A | N/A |
| Persistent Proxy N_Port 22 | F_ID = F_A NPID = FA_PS | F_ID = F_C NPID = FC_C (81) | WWPN_S | Pair_ID = 1 Select F_C (82) |

Figure 8a

| N_Port (41) | N_Port ID (NPID) (42) | pointer to N_Port ID (physical NPID) (43) | World Wide Port Name (WWPN) (44) | Path Selection Pair ID (45) |
|---|---|---|---|---|
| N_Port B 8 (Src Storage) | F_ID = F_B NPID = FB_B | (N/A) | WWPN_S | N/A |
| Proxy N_Port A 23 | F_ID = F_B NPID = FB_PA | F_ID = F_A NPID = FA_A | WWPN_A | Pair_ID = 1 (Not Select) (83) |

Figure 8b

| N_Port (41) | Proxy N_Port (NPID) (42) | pointer to N_Port ID (physical NPID) (43) | World Wide Port Name (WWPN) (44) | Path Selection Pair ID (45) |
|---|---|---|---|---|
| N_Port C 10 (Dest Storage) | F_ID = F_C NPID = FC_C | (N/A) | WWPN_S | N/A |
| Proxy N_Port A 24 | F_ID = F_C NPID = FC_PA | F_ID = F_A NPID = FA_A | WWPN_A | Pair_ID = 1 Select F_C (84) |

Figure 8c

COMPUTER SYSTEM CONTROL METHOD AND COMPUTER SYSTEM

TECHNICAL FIELD

The present invention relates to a computer system control method and a computer system in which a server and a storage apparatus are coupled via a fibre channel network.

BACKGROUND ART

In a conventional data center, a large number of servers and multiple storage apparatuses are coupled via a fibre channel (FC) interface. For example, a server, a network apparatus or a storage apparatus may be replaced with a new apparatus, a new apparatus may be added, or an old apparatus may be removed from the computer system due to a degrade in apparatus performance, the end of apparatus service life, a shortage of apparatus capacity, a shortage of network bandwidth, or the scaling up of a system.

In conventional server virtualization technology, multiple virtual machines can be operated by running virtualization software on a physical server. In this server virtualization technology, a virtual machine, which is running on one physical server, can be temporarily suspended, and migrated to the virtualization software running on another physical server. Management operations according to the addition, replacement or removal of a server are implemented using this technology.

As described above, in the prior art, it is possible to run multiple virtual machines on a physical server. In order to operate a virtual machine that is running on one physical server on another physical server, it is preferable to virtualize a fibre channel port so as to enable the FC port to also be migrated in terms of virtual machines. Accordingly, a technology (NPIV: N_Port Identifier Virtualization) for virtualizing the name of an FC node port (N_Port), which is an FC protocol expansion technique, is used. It is possible to migrate an FC port in virtual machine units by using a switch and host bus adapter (HBA) corresponding to NPIV.

In NPIV, it is preferable not to change the name identifier (WWPN: World Wide Port Name) allocated to a virtual node port (VN_Port) between the pre-migration server WWPN and the post-migration server WWPN. The reason for this will be explained. A zoning function, which is an FC switch security function, implements access control using either the WWPN, which is the name identifier of the N_Port, or a N_Port ID, which is calculated from either an FC switch domain number or a physical port number. When the FC switch zoning changes, a configuration change of the entire change-targeted fabric occurs, temporarily suspending IO (Input/Output) of all other N-Ports unrelated to the zoning setting target N_Port. Therefore, the greater the increase in the number of switches (number of domains) or the number of nodes that belong to the fabric, the longer the IO suspension time. For this reason, the zoning setting cannot be easily changed in a large-scale FC fabric configured using multiple FC switches.

Furthermore, there are two types of FC zoning. The one is based on a Port identifier (N_Port ID), and the other is based on the name identifier (WWPN). In a case where the Port identifier-based zoning is used, the zoning must always be changed in a virtual machine migration. The reason for this is because the N_Port ID always changes when a virtual machine is migrated to another physical server, and frame transfer related to a post-migration virtual machine is not allowed by the zoning function based on the FC switch Port identifier. Therefore, in order to implement the migration of a virtual machine across physical computers using server virtualization technology, the user managing the computer system must implement settings that base the FC port zoning function on WWPN. The user passes on the same WWPN as the pre-migration WWPN to the VN_Port (NPIV virtual N_Port) before and after the virtual machine migration. In doing so, the user is able to migrate the virtual machine to another physical server without changing the FC switch WWPN-based zoning setting at all.

In the past, most network equipment was configured redundantly. In a redundantly configured network, subsequent to replacing network equipment (an FC switch or the like) of the one system with new network equipment, it is possible to replace the network equipment of the other system with new network equipment as well. Due to this, it is possible to achieve a network with higher performance and/or higher bandwidth.

In a storage addition operation or migration operation as well, it is conceivable that the user is able to migrate a storage without changing the FC switch zoning setting by having a function in which the destination storage N_Port assumes the WWPN of the source storage the same as in the migration of the server virtual machine. However, there have been no disclosures with regard to technology related to the problem of IO processing suspension time becoming longer in accordance with the FC switch processing time ([Patent Literature 1]).

Furthermore, in conventional FC, there is a Virtual Fabric (VF) and technology for routing between Virtual Fabrics. The Virtual Fabric is technology for minimizing the scope of Zoning changes. Specifically, it is similar to Ethernet (registered trademark) virtual LAN (VLAN: Virtual Local Area Network) technology, and is technology for minimizing the extent of the impact of IO suspension in accordance with topology changes and setting changes of another fabric by logically dividing the FC fabric. Also, since virtual fabrics are not able to communicate with one another when virtual fabrics are used, an Inter Fabric Router (IFR) has been standardized as technology for implementing routing between virtual fabrics for the purpose of communicating between virtual fabrics. However, since zoning information is also sent and received between fabrics and the zoning settings change from one fabric to the other when different fabrics are coupled via a router, the extent of the impact on IO suspension increases in accordance with the zoning changes ([Patent Literature 2], [Non-patent Literature 1]).

CITATION LIST

Patent Literature

PTL 1: Application US 2007/0263637 A1 (on-line data migration of a logical/virtual storage array)
PTL 2: Application US 2006/0034302 A1 (Inter-Fabric Routing)

Non-Patent Literature

NPL 1: Fibre Channel—Inter-Fabric Routing
http://www.t11.org/ftp/t11/pub/fc/ifr/10-138v0.pdf
(pages 20-50)

SUMMARY OF INVENTION

Technical Problem

However, it is impossible to apply the same thinking as the NPIV in the server virtualization technology to a storage apparatus migration operation. The reason for this is as follows.

When an FC port (N_Port) is migrated from one storage to another storage, the source storage N_Port logged out from the switch one time. For this reason, the processing of all IO requests issued with respect to the storage FC port logged out from the server is temporarily terminated. Generally speaking, since processing for the N_Port to log in to the switch is implemented by software inside the FC switch and uses an appropriate Zoning process, the switch control processing takes longer to complete than normal IO execution time. For this reason, in a large-scale data center, all the servers utilizing the migration-target storage must be temporarily suspended. In contrast to this, in a case where a virtual machine is migrated, the virtual machine is migrated after temporarily suspending IOs at the source, but the IOs are resumed at the destination, and a situation in which the IOs of other virtual machines besides the migrating virtual machine are suspended does not occur. The problems when migrating a storage apparatus volume to another apparatus differ in this way from those of the prior art for migrating a virtual machine.

As another aspect, in a large-scale data center, there are cases where components in a server rack have not been made redundant. In such a case, when a component inside the server rack malfunctions, an operation that migrates everything to the equipment inside another server rack is conceivable. In a case where an operation like this is implemented, it is also conceivable that a switch inside the server rack does not comprise a redundant configuration (a multi-path configuration). In the case of a data center that comprises multi-path configuration switches, storage migration is also relatively simple. However, a more convenient storage migration that does not involve a long-term suspension of host IOs is also required at data centers that do not comprise multi-path configurations.

Accordingly, the present invention provides a computer system control method and a computer system that enable a storage apparatus migration to be performed easily and quickly.

Solution to Problem

A computer system control method according to a first aspect is a control method of a computer system, which comprises a host computer that participates in a first fabric, a source storage apparatus that participates in a second fabric, a destination storage apparatus that participates in a third fabric, a management computer that is coupled via a management network to the host computer, the source storage apparatus and the destination storage apparatus, and a switch that controls couplings among the first fabric, the second fabric and the third fabric, the switch being configured so as to separately manage the second fabric and the third fabric, and to couple the first fabric to either the second fabric or the third fabric, and the control method of a computer system executing: a setting step of setting a same port name identifier as a port name identifier that has been set in a source port of the source storage apparatus in a destination port of the destination storage apparatus using the management computer; a login step of causing the destination port to log in to the third fabric; a volume migration step of migrating a migration-target logical volume from the source storage apparatus to the destination storage apparatus; and a switchover step of switching the switch, to which a switchover instruction has been issued, from a first state, in which the first fabric and the second fabric are coupled and the third fabric is decoupled, to a second state, in which the first fabric and the third fabric are coupled and the second fabric is decoupled.

In a second aspect according to the first aspect, a cancellation step of cancelling processing of an IO (Input Output) request, which the source storage apparatus has received from the host computer, is executed between the volume migration step and the switchover step, and subsequent to the switchover from the first state to the second state in the switchover step, a retry step of causing the host computer to reissue the IO request that has been cancelled in the cancellation step, is executed.

In a third aspect according to the second aspect, the switch comprises a first port, which is coupled to a port of the host computer via the first fabric, a second port, which is coupled to the source port via the second fabric, a third port, which is coupled to the destination port via the third fabric, a table that manages identifiers for identifying a coupling-destination port for each of the first port, the second port and the third port, and a selection status for showing either the second fabric or the third fabric has been selected, and a computer program for rewriting the table in a case where the switchover has been instructed, and wherein, in the switchover step, the first state is switched to the second state by the computer program rewriting the table.

In a fourth aspect according to the third aspect, prior to the login step, the port of the host computer executes a step of carrying out a port login and a process login with respect to the source port of the source storage apparatus, and a step of acquiring information related to the port login and the process login and holding the acquired information in the switch, and subsequent to the login step, the third port executes a proxy login step of carrying out a port login and a process login with respect to the destination port on behalf of the host computer port using the information related to the port login and the process login held in the switch to In a fifth aspect according to the fourth aspect, the source storage apparatus and the destination storage apparatus are coupled via an inter-apparatus communication path that is provided separately from the fabrics and the management network, and in the volume migration step, the logical volume is migrated from the source storage apparatus to the destination storage apparatus via the inter-apparatus communication path.

In a sixth aspect according to the fifth aspect, in the volume migration step, the destination storage apparatus mounts the logical volume via the inter-apparatus communication path, and in the retry step, the destination storage apparatus transfers the IO request reissued from the host computer to the source storage apparatus via the inter-apparatus communication path, and causes the IO request to be executed by the source storage apparatus and returns the result of this processing to the host computer.

In a seventh aspect according to the sixth aspect, subsequent to the retry step, data of the logical volume is copied to the logical volume in the destination storage apparatus via the inter-apparatus communication path, and the IO request from the host computer is processed using the logical volume in the destination storage apparatus.

In an eighth aspect according to the seventh aspect, the host computer comprises two ports, the switch comprises a first switch, which is coupled to one of the ports of the host computer, and a second switch, which is coupled to the other port of the host computer, and the first switch and the second switch are each coupled to the management computer, the source port and the destination port.

In a ninth aspect according to the first aspect, a switchover instruction source which instructs the switch to perform a switchover is either the source storage apparatus or the destination storage apparatus, which has taken the initiative in a migration of the logical volume.

In a tenth aspect according to the first aspect, the switchover instruction is issued to the switch by the source storage apparatus logging out of the second fabric.

In an eleventh aspect according to the first aspect, the volume migration step and the switchover step are executed in accordance with an instruction from either the host computer or the management computer.

A computer system according to another aspect of the present invention includes: a host computer that participates in a first fabric; a source storage apparatus that participates in a second fabric; a destination storage apparatus that participates in a third fabric; a management computer that is coupled via a management network to the host computer, the source storage apparatus and the destination storage apparatus; and a switch that controls couplings among the first fabric, the second fabric and the third fabric, wherein the switch is configured so as to separately manage the second fabric and the third fabric, and to couple the first fabric to either the second fabric or the third fabric, the management computer sets a same port name identifier as a port name identifier that has been set in the source port of a source storage apparatus in a destination port of the destination storage apparatus, the destination storage apparatus logs in to the third fabric prior to the a switchover instruction being issued to the switch, a migration-target logical volume in the source storage apparatus is migrated from the source storage apparatus to the destination storage apparatus prior to the switchover instruction being issued to the switch, and the switch, when the switchover instruction is issued, switches from a first state, in which the first fabric and the second fabric are coupled and the third fabric is decoupled, to a second state, in which the first fabric and the third fabric are coupled and the second fabric is decoupled.

The characteristic features described with respect to the computer system control method are also applicable to the computer system. In addition, the present invention may also be understood as a control program of the computer system. The control program can be distributed via either a communication medium or a recording medium. The present invention may also be understood as a switch for the computer system.

BRIEF DESCRIPTION OF DRAWINGS

FIGS. 3A through 3C are diagrams showing routing tables of the inter fabric router.

FIG. 5 is a diagram showing the path of an FC frame that is routed from a host to a storage apparatus.

FIGS. 8A through 8C are diagrams showing routing tables of the inter fabric router subsequent to a switchover process.

DESCRIPTION OF EMBODIMENTS

The embodiment of the present invention will be explained hereinbelow based on the drawings. The present invention uses a switch for coupling multiple mutually independent fabrics, and, in addition, sets the same WWPN as the WWPN of a source storage apparatus in the name identifier of the FC port of a destination storage apparatus. Then the embodiment logs the destination storage apparatus in to a switch beforehand so as not to affect a communication that is currently being used, and at a predetermined switchover timing, couples a host to the destination storage apparatus. By finishing the login and other such initialization procedures in advance, and implementing the switchover of switch routing information faster than the time it takes of a login or the like, the embodiment makes it possible to perform a storage apparatus migration relatively easily and quickly.

EXAMPLE 1

Figure 1:
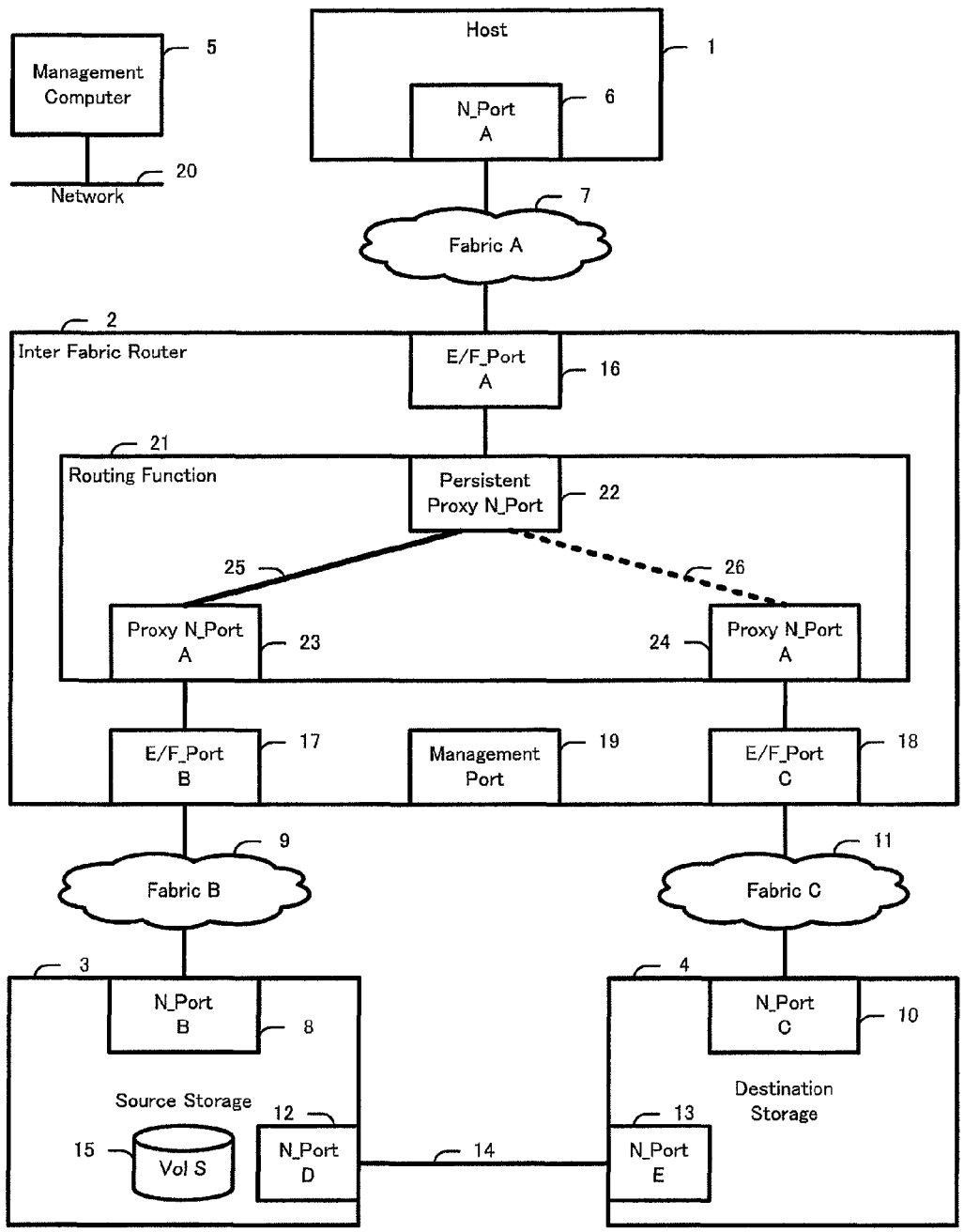
FIG. 1 is a diagram showing the overall system of a first example.

FIG. 1 shows the entire computer system of a first example. The computer system, for example, comprises a host 1, an inter fabric router 2 as a "switch", a source storage apparatus 3, a destination storage apparatus 4, and a management computer 5. The inter fabric router 2 will be explained in detail further below using FIG. 2.

A node port (N_Port) 6 of the host 1 and the inter fabric router 2 are coupled to a fibre channel network (fibre channel will be abbreviated as FC hereinafter) of a fabric 7. The N_Port 8 of the source storage apparatus 3 and the inter fabric router 2 are coupled to the FC network of a fabric 9. The N_Port 10 of the destination storage apparatus 4 and the inter fabric router 2 are coupled to the FC network of a fabric 11. This example is also applicable to an FC Over Ethernet (FCoE) network, which stores an FC frame 51 (Refer to FIG. 4A) in an Ethernet (registered trademark). The fabrics shown in FIG. 1 may be either an FC or an FCoE.

A N_Port 12 of the source storage apparatus 3 and a N_Port 13 of the destination storage apparatus 4 are coupled via a path 14. This path 14 is a data migration path that is used for either migrating or mounting a logical volume 15, which is the data storage area of the source storage apparatus 3, to the destination storage apparatus 4. This path 14 may be directly coupled as in FIG. 1, or may be configured having a switch in between the two storage apparatuses. Furthermore, the path 14 switch may be tailored as the switching function of the inter fabric router 2.

In a case where an FC switch exists in the fabric 7, this FC switch and the inter fabric router 2 are coupled via an expansion port (E_Port) 16. In a case where the inter fabric router 2 and the N-Port 6 are directly coupled, the inter fabric router 2 and the N-Port 6 are coupled via a fabric port (F_Port) 16. Similarly, the fabric 9 is coupled via either an E-Port 17 or an F_Port 17. Similarly, the fabric 11 is also coupled via either an E-Port 18 or an F_Port 18.

The management computer 5 is coupled to the host 1, a management port 19 of the inter fabric router 2, the source storage apparatus 3, and the destination storage apparatus 4 via a management network 20. The management network 20 is partially shown in the drawing, but the management computer 5 is coupled to the host 1, the inter fabric router 2, the source storage apparatus 3, and the destination storage apparatus 4 via the management network 20.

The inter fabric router 2 has a routing function 21. The routing function 21 is a router for coupling three fabrics that differ from one another, i.e., a first fabric 7 (Fabric A in the drawing), a second fabric 9 (Fabric B in the drawing), and a third fabric 11 (Fabric C in the drawing). The routing function 21 will be explained in detail further below using FIG. 2.

The routing function 21 has a persistent proxy N_Port 22, which serves as a proxy for N_Port 8 of the source storage apparatus 3 that belongs to the second fabric 9, to the host 1. The persistent proxy N_Port 22 belongs to the first fabric 7. Similarly, the routing function 21 has a proxy N_Port 23, which serves as the proxy for the N_Port 6 of the host 1, which belongs to the first fabric 7, with respect to the source storage apparatus 3. The proxy N_Port 23 belongs to the second fabric 9. Similarly, the routing function 21 has a proxy N_Port 24, which serves as the proxy for the N_Port 6 of the host 1, which belongs to the first fabric 7, with respect to the destination storage apparatus 4. The proxy N_Port 24 belongs to the third fabric 11.

The user allocates a unique fabric identifier (F_ID) to each of the first fabric 7, the second fabric 9, and the third fabric 11. The F_ID of each fabric is different. For this reason, for example, switches comprising the same FC domain ID may exist in the first fabric 7 and the second fabric 9. Furthermore, N_Ports which have been allocated the same N_Port identifier (N_Port ID) may exist in the first fabric 7 and the second fabric 9.

In a case where the first fabric 7 and the second fabric 9 are coupled via the one routing path 25 of the inter fabric router 2 indicated by a solid line in the drawing, the same port name identifier (WWPN: World Wide Port Name Identifier) must not be duplicated in the first fabric 7 and the second fabric 9. That is, N_Ports comprising the same port name identifier are not allowed to exist in both the first fabric 7 and the second fabric 9.

Note that the other routing path 26 of the inter fabric router 2 indicated by a dotted-line in the drawing does not couple the first fabric 7 and the third fabric 11. In this case, even when the WWPN of a N_Port that belongs to either the first fabric 7 or the second fabric 9 is the same as the WWPN of the N_Port that belongs to the third fabric 11, this duplication is allowed. Since the first fabric 7 and the second fabric 9 are separated from the third fabric 11 by the routing function 21, the inter fabric router 2 does not detect a protocol violation as a result of a duplicate login of the same WWPN in the FC standard.

Figure 2:
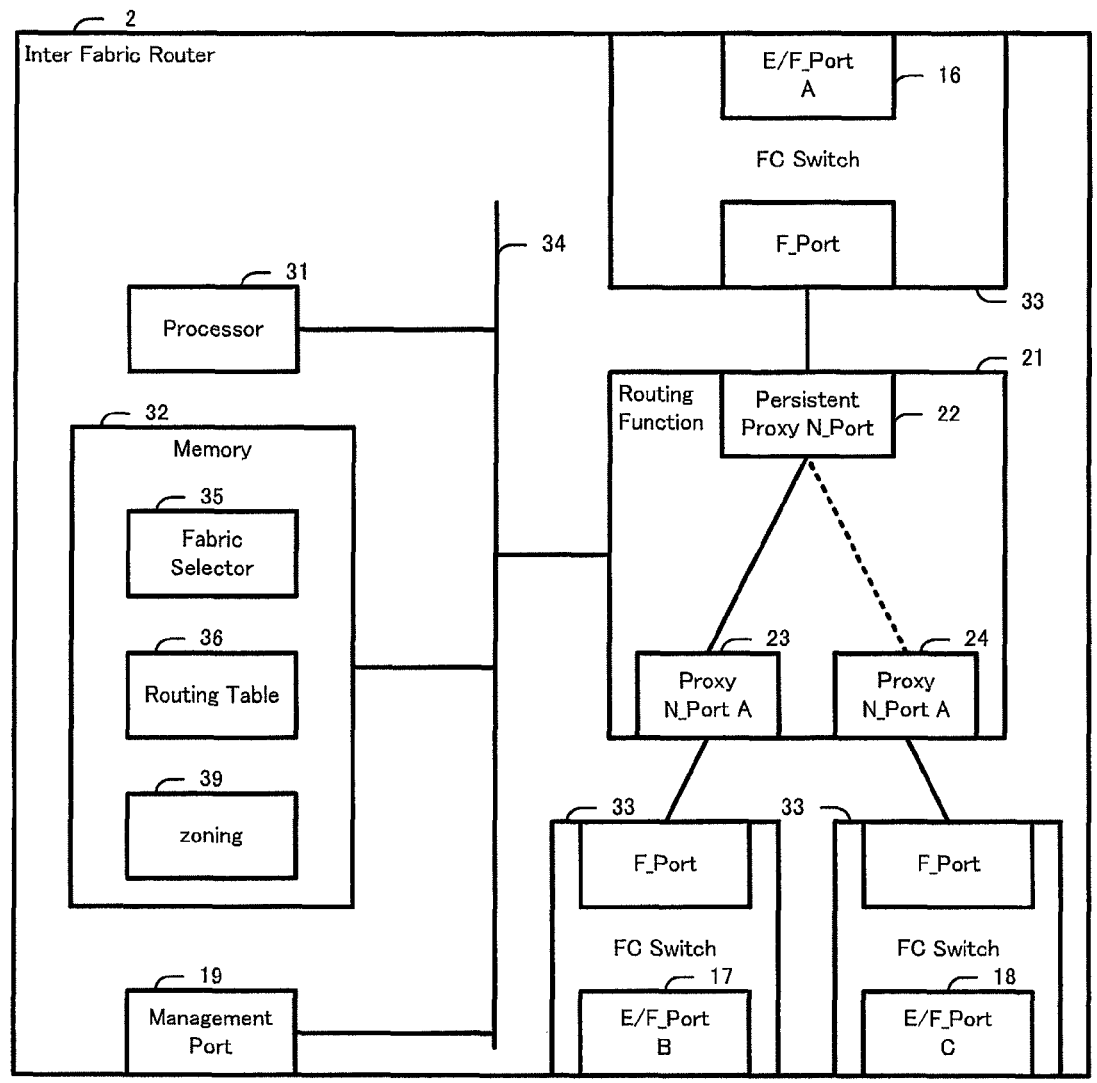
FIG. 2 is a diagram showing the internal configuration of an inter fabric router.

FIG. 2 is a diagram showing the internal configuration of the inter fabric router 2. The inter fabric router 2, for example, has the routing function 21, a control processor 31, a memory 32, a management port 19, and an FC switch 33.

The control processor 31 is coupled to the routing function 21, the memory 32, and the management port 19 via a bus 34. The memory 32 holds a fabric selector 35, a routing table 36, and zoning information 39. The routing table 36 will be described in detail further below using FIG. 3.

The FC switch 33 acts as a domain conversion switch for converting the domain numbers of the respective proxy N_Ports 22, 23, 24, and acts as a front FC switch for expanding the number of ports of the inter fabric router 2. In a case where the function, which is able to realize the respective functions described above, can be built into a proxy N_Port, the inter fabric router 2 does not need the FC switch 33. The zoning information 39 holds WWPN-based zoning information and makes it possible to implement access control across the respective fabrics 7, 9, 11 of FIG. 1. In a case where zoning information is set in the respective fabrics 7, 9, 11, for example, it is possible to mutually send and receive zoning information and achieve synchronization among the fabrics by using an IFR zone protocol (IFR_ZP), which is described in Chapter 8 of the IFR Standard [Non-Patent Literature 1].

FIGS. 3A through 3C show the routing tables 36 held in the inter fabric router 2 in detail. FIG. 3A shows the routing table related to the first fabric 7. FIG. 3B shows the routing table related to the second fabric 9. FIG. 3C shows the routing table related to the third fabric 11.

The routing table 36 has tables corresponding to each of the fabrics 7, 9, 11 (FIGS. 3A through 3C in this example). Since the fields of the respective entries in the FIGS. 3A through 3C are shared in common, each field will be explained by referring to FIG. 3A. The routing table 36 has entries corresponding to the name 41 of the N_Port that belongs to a fabric. The respective entries include a N_Port ID 42, information 43 of the N_Port to which the proxy N_Port is pointing, a N_Port WWPN 44, and a path selection pair ID & state 45.

The N_Port ID 42 is an N_Port ID for specifying a source/destination of another N_Port that belongs to the same fabric identifier (F_ID). Specifically, the N_Port ID 42 is used as the ID (D_ID 52, S_ID 53) that shows either the source or the destination in the FC frame header 51 of FIG. 4A to be explained further below. The FC frame will be explained in detail using FIG. 4A. When the N_Port sends an initialization message for participating in the fabric (a fabric login: FLOGI) to the FC switch, the FC switch nameserver allocates a N_Port ID to this N_Port. The FC switch sends an FLOGI response (FLOGI LS_ACC) to this N_Port. In accordance with this procedure (called the fabric login hereinafter), the N_Port logs in to the fabric and is allocated a N_Port ID.

The information 43 of the N_Port to which the proxy N_Port is pointing is information of the N_Port that is represented by the proxy N_Port. The information 43 of the N_Port to which the proxy N_Port is pointing holds an F_ID and a N_Port ID pair, which is information related to the actual N_Port being pointed to by the proxy N_Port. The N_Port being pointed to by the proxy N_Port is an N_Port that belongs to a different fabric than the fabric to which the proxy N_Port belongs. For this reason, the F_ID inside the information 43 differs from the F_ID of the proxy N_Port. The N_Port ID (abbreviated as NPID in FIG. 3A) must not be duplicated inside a single fabric. However, it is possible to determine that two fabrics are different fabrics due to the F_ID. Therefore, the N_Port IDs may be duplicated between two different fabrics. Since neither the host N_Port nor the storage apparatus N_Port is a proxy N_Port, this field 43 is not held. Therefore, N/A is set in the drawing.

The N_Port WWPN 44 holds either the N_Port WWPN or the WWPN of the N_Port that belongs to another fabric that is being pointed to by a proxy N_Port.

The path selection pair ID & state 45 holds a pair ID, which is allocated in a case where there are N_ports with the same WWPN across fabrics. The persistent proxy N_Port 22 has an ID for identifying a pair of N_Ports that are the same across fabrics. Even a proxy N_Port entry, which is created for pointing to an N_Port that belongs to the fabric into which the persistent proxy N_Port 22 is logged, holds the path selection pair ID & state 45. The N_Ports 6, 8, 10 other than the persistent proxy N_Port 22 and the proxy N_Ports 23, 24 do not hold the path selection pair ID & state 45. Therefore, N/A is notated in the drawing.

The states in FIGS. 1 and 3 will be explained in detail. The F_ID of the first fabric 7 is F_A. The F_ID of the second fabric 9 is F_B. The F_ID of the third fabric 11 is F_C. The F_IDs of the N_Port 6 and the proxy N_Port 22 that belong to the first fabric 7 are set to F_ID F_A as shown in the field 42 of FIG. 3A. The F_IDs of the N_Port 8 and the proxy N_Port 23 that belong to the second fabric 9 are set to F_ID F_B as shown in the field 42 of FIG. 3B. The F_IDs of the N_Port 10 and the proxy N_Port 24 that belong to the third fabric 11 are set to F_ID F_C as shown in the field 42 of FIG. 3C.

The N_Port ID 42 of the N_Port 6 is FA_A (field 42 of the N_Port 6 of FIG. 3A). The N_Port ID 42 of the N_Port 8 is FB_B (field 42 of the N_Port 8 of FIG. 3B). The N_Port ID 42 of the N_Port 10 is FC_C (field 42 of the N_Port 10 of FIG. 3C).

The N_Port ID 42 of the persistent proxy N_Port 22 is FA_PS (field 42 of the persistent proxy N_Port 22 of FIG. 3A). The N_Port ID 42 of the proxy N_Port 23 is FB_PA (field 42 of the proxy N_Port 23 of FIG. 3B). The N_Port ID 42 of the proxy N_Port 24 is FC_PA (field 42 of the proxy N_Port 24 of FIG. 3C).

The information 43 of the N_Port pointed to by the persistent proxy N_Port 22 stores the N_Port ID (=FB_B) of the N_Port 8 for which the F_ID is set to F_B (field 43 of the persistent proxy N_Port 22 of FIG. 3A). The information 43 of the N_Port pointed to by the proxy N_Port 23 stores the N_Port ID (=FA_A) of the N_Port 6 for which the F_ID is set to F_A (field 43 of the proxy N_Port 23 of FIG. 3B). The information 43 of the N_Port pointed to by the proxy N_Port 24 stores the N_Port ID (=FA_A) of the N_Port 6 for which the F_ID is set to F_A (field 43 of the proxy N_Port 24 of FIG. 3C).

The WWPN 44 of N_Port 6 is WWPN_A (field 44 of N_Port 6 of FIG. 3A). The WWPN 44 of N_Port 8 is WWPN_S (field 44 of N_Port 8 of FIG. 3B). The WWPN 44 of N_Port 10 is WWPN_S (field 44 of N_Port 10 of FIG. 3C). Because the N_Port 10 of the destination storage apparatus 4 takes over the WWPN of the N_Port 8 of the source storage apparatus 3, the WWPN of the N_Port 10 of the destination storage apparatus and the WWPN of the N_Port 8 of the source storage apparatus are the same.

Due to this, there is no need to change the FC zoning settings (access control) in all the fabrics 7, 9, 11 before or after a migration from the source storage apparatus 3 to the destination storage apparatus 4. Therefore, in this example, not all of the IOs of the N_Ports belonging to the fabrics 7, 9, 11 are suspended in order to update the zoning information 39. Furthermore, in this example, the host 1 is able to access the destination storage apparatus 4 for 10 and read or write data to the logical volume 15 subsequent to a path switchover without changing to the N_Port ID 42 and WWPN 44 of the persistent proxy N_Port 22, which points to the pre-switchover storage.

The WWPN 44 of the persistent proxy N_Port 22 is WWPN_S (field 44 of the persistent proxy N_Port 22 of FIG. 3A). The WWPN 44 of the proxy N_Port 23 is WWPN_A (field 44 of the proxy N_Port 23 of FIG. 3B). The WWPN 44 of the proxy N_Port 24 is WWPN_A (field 44 of the proxy N_Port 24 of FIG. 3C). Since the routing path 26 has not been selected in the state of FIG. 1 (since the path 26 has not been set to valid), the fabric selector 35 does not select the third fabric 11. Therefore, the proxy N_Port 24 does not route an FC frame from N_Port 6 of WWPN_A.

N_Port 8 and N_Port 10, which are targeted for path switchover, hold the same WWPN. In order to associate the path selection of N_Port 8 and N_Port 10, "1" is set as the identifier in the path selection pair ID & state 45 of the persistent proxy N_Port 22 (field 45 of the persistent proxy N_Port 22 of FIG. 3A). Furthermore, the path selection pair ID & state 45 holds a value (Select F_ID=F_B) showing that the F_B side is selected as the path selection state.

Based on the information 43 of the N_Port being pointed to by the proxy N_Port 23, it is clear that the proxy N_Port 23 is the N_Port representing the N_Port 6 of the host 1 that belongs to the fabric F_A. ID=1 is set in the path selection pair ID & state 45 with respect to all the proxy N_Ports 23, 24 that represent the N_Port 6 of the host 1 that belongs to the fabric F_A. In a case where multiple storage apparatus N_Ports exist, another path selection pair ID & state 45 (for example "2") is allocated to the other N_Ports targeted for path switchover. Setting a different Pair ID for each path switchover-target N_Port pair makes it possible to multiple of switch paths in pair units. A case in which multiple pairs exist will be explained further below using FIGS. 23 and 24.

In the example shown in FIG. 1, the host, which belongs to the first fabric 7 (F_ID=F_A), comprises only the N_Port 6. Therefore, "1" is set in the path selection pair ID & state 45 of the proxy N_Port 23 of the N_Port 6, and, in addition, "select F_B" is set as the selection state (field 45 of proxy N_Port 23 of FIG. 3B). That is, in the state shown in FIG. 1, the second fabric 9 (F_ID=F_B) is made valid.

In the other proxy N_Port 24 that represents the N_Port 6, "1" is set in the path selection pair ID & state 45, and, in addition, "not select" is set as the selection state (field 45 of the proxy N_Port 24 of FIG. 3C). That is, in the state shown in FIG. 1, the third fabric 11 (F_ID=F_C) is set to invalid.

In the FIG. 3A, N/A is set in the path selection pair ID & state 45 of the N_Port 6 (field 45 of the N_Port 6 of FIG. 3A). Similarly, N/A is set in the path selection pair ID & state 45 of the N_Port 8 (field 45 of the N_Port 8 of FIG. 3B). Similarly, N/A is set in the path selection pair ID & state 45 of the N_Port 10 (field 45 of the N_Port 10 of FIG. 3C).

Figure 4A:
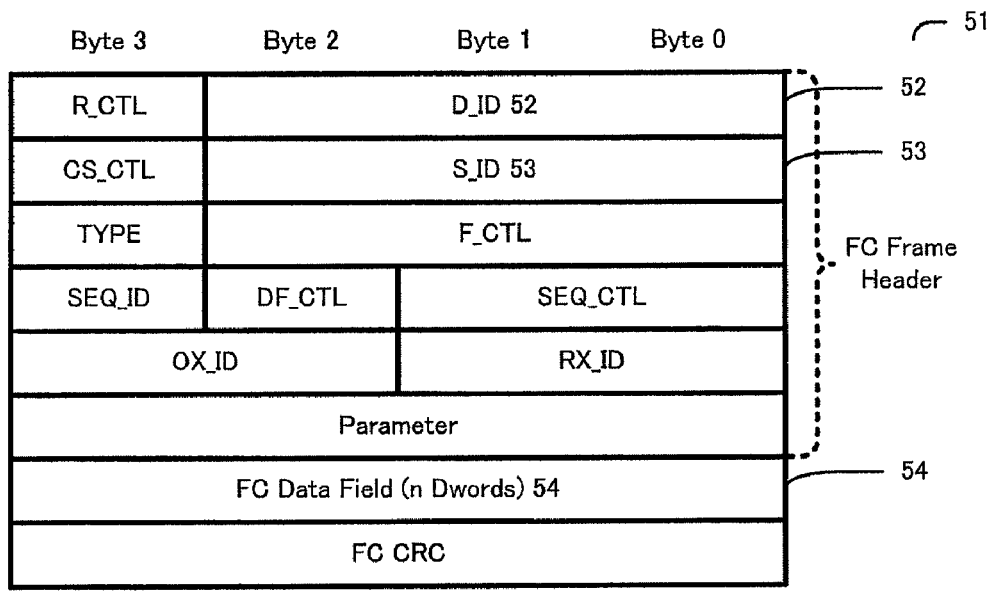
FIG. 4A is a diagram showing an FC frame format.
Figure 4B:
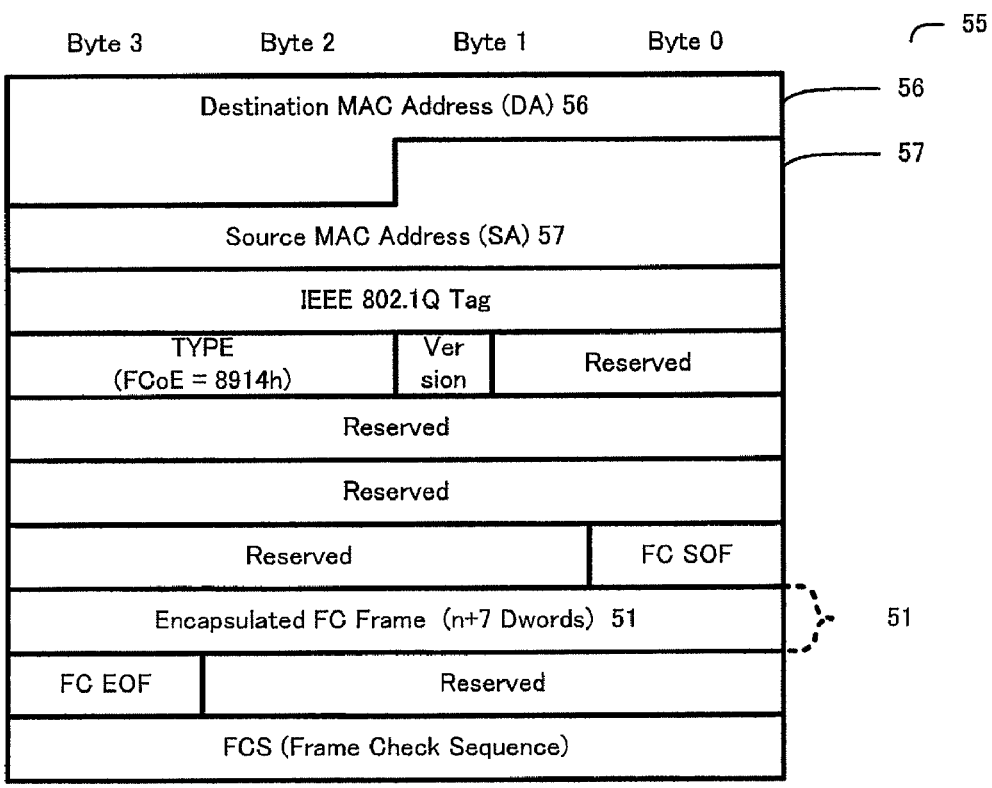
FIG. 4B is a diagram showing an FCoE frame format.
Figure 4C:
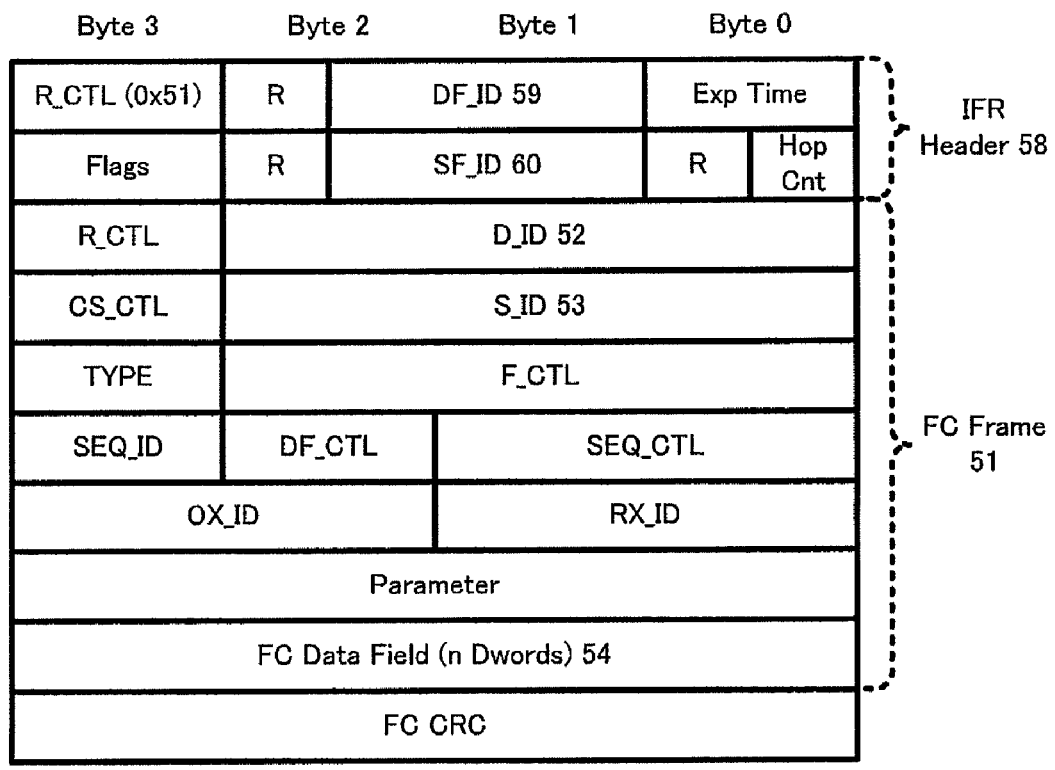
FIG. 4C is a diagram showing an inter fabric router header.

FIG. 4A shows an FC frame format 51. FIG. 4B is a diagram showing an FCoE frame format 55. FIG. 4C is a diagram showing an FC frame comprising an inter fabric router header (IFR Header) 58.

The FC frame format 51 shown in FIG. 4A comprises a DID 52, which is the field for storing the destination N_Port ID, a S_ID 53, which is the field for storing the source N_Port ID, an FC Data Field 54, which is the field for storing FC data, and other fields.

The FCoE frame format 55 shown in FIG. 4B comprises a destination MAC Address (DA) 56, a source MAC Address (SA) 57, an FC Frame 51, and other fields. The DA 56 and the SA 57 are the MAC Addresses created from the N_Port ID. Furthermore, in a case where the present invention is applied to FCoE, the FC switch 33 of each drawing and the FC switch inside each fabric may respectively be replaced with FCoE. Therefore, these switches have been omitted from the drawing.

The IFR header format 58 shown in FIG. 4C is for storing the source fabric identifier and the destination fabric identifier for inter fabric routing, and is a header that is added to the FC frame format 51. The IFR header format 58 has a destination fabric identifier (DF_ID) 59 and a source fabric identifier (SF_ID) 60. An FC frame 51 that is expanded by providing the IFR header format 58 corresponds to the expansion FC frame 65 in FIG. 5, which will be described below.

FIG. 5 shows the path of an FC frame that is sent to the N_Port 8 of the storage apparatus 3 from the N_Port 6 of the host 1. The persistent proxy N_Port 22 is the proxy port that points to the N_Port 8. In FIG. 5, the information 61 of the N_Port pointed to by the persistent proxy N_Port 22 is displayed. The content of this information 61 matches the content of the field 43 of the persistent proxy N_Port 22 of FIG. 3A.

The proxy N_Port 23 is the proxy port that points to the N_Port 6. In FIG. 5, the information 62 of the N_Port pointed to by the proxy N_Port 23 is displayed. The content of this information 62 matches the field 43 of the proxy N_Port 23 of FIG. 3B.

An FC frame path 63 from the N_Port 6 of the host 1 to the N_Port 8 of the storage apparatus 3 will be explained. The N_Port 6 creates and sends an FC frame 64. In this FC frame 64, the N_Port ID of the persistent proxy N_Port 22 (N_Port ID=FA_PS) is set in the D_ID 52 of the FC frame 51, and, in addition, the N_Port ID of the N_Port 6 (N_Port ID=FA_A) is set in the S_ID 53 of the FC frame 51.

The persistent proxy N_Port 22 creates an expansion FC frame 65 that adds the inter fabric router header (IFR Header) 58 to the FC frame 51. Specifically, the persistent proxy N_Port 22 converts the D_ID 52 in the received FC frame 64 to the N_Port ID of the N_Port 8 (FB_B) based on the information 61 of the N_Port pointed to by the persistent proxy N_Port 22 (FA_PS→FB_B). In addition, the persistent proxy N_Port 22 adds the IFR header 58 to the D_ID 52-changed FC frame 51 so the routing function 21 is able to identify the destination fabric.

F_A, which is the F_ID of the first fabric 7 to which the persistent proxy N_Port 22 belongs, is set in the SF_ID 60 of the IFR header 58. Further, based on the information 61 of the N_Port pointed to by the persistent proxy N_Port 22, F_B is set in the DF_ID 59 of the IFR header 58.

The expansion FC frame 65 that has been sent from the persistent proxy N_Port 22 is routed to the fabric 9 (F_ID=F_B) from the fabric 7 (F_ID=F_A) by the routing function 21. In this expansion FC frame 65, the SF_ID is set to F_A and the S_ID is set to FA_A. Therefore, the destination proxy N_Port to which the expansion FC frame 65 is delivered is the proxy N_Port 23, the contents of which match the information 62(F_ID=F_A, NPID=FA_A).

The Proxy N_Port 23 removes the IFR header 58 from the received expansion FC frame 65, and extracts an FC frame 66 from the FC frame 51. The S_ID of this FC frame 66 is converted to FB_PA, which is the N_Port ID of the proxy N_Port 23. The proxy N_Port 23 sends the FC frame 66 to the second fabric 9 (F_B). The FC frame 66 arrives at the N_Port 8 that belongs to the second fabric 9.

Figure 6:
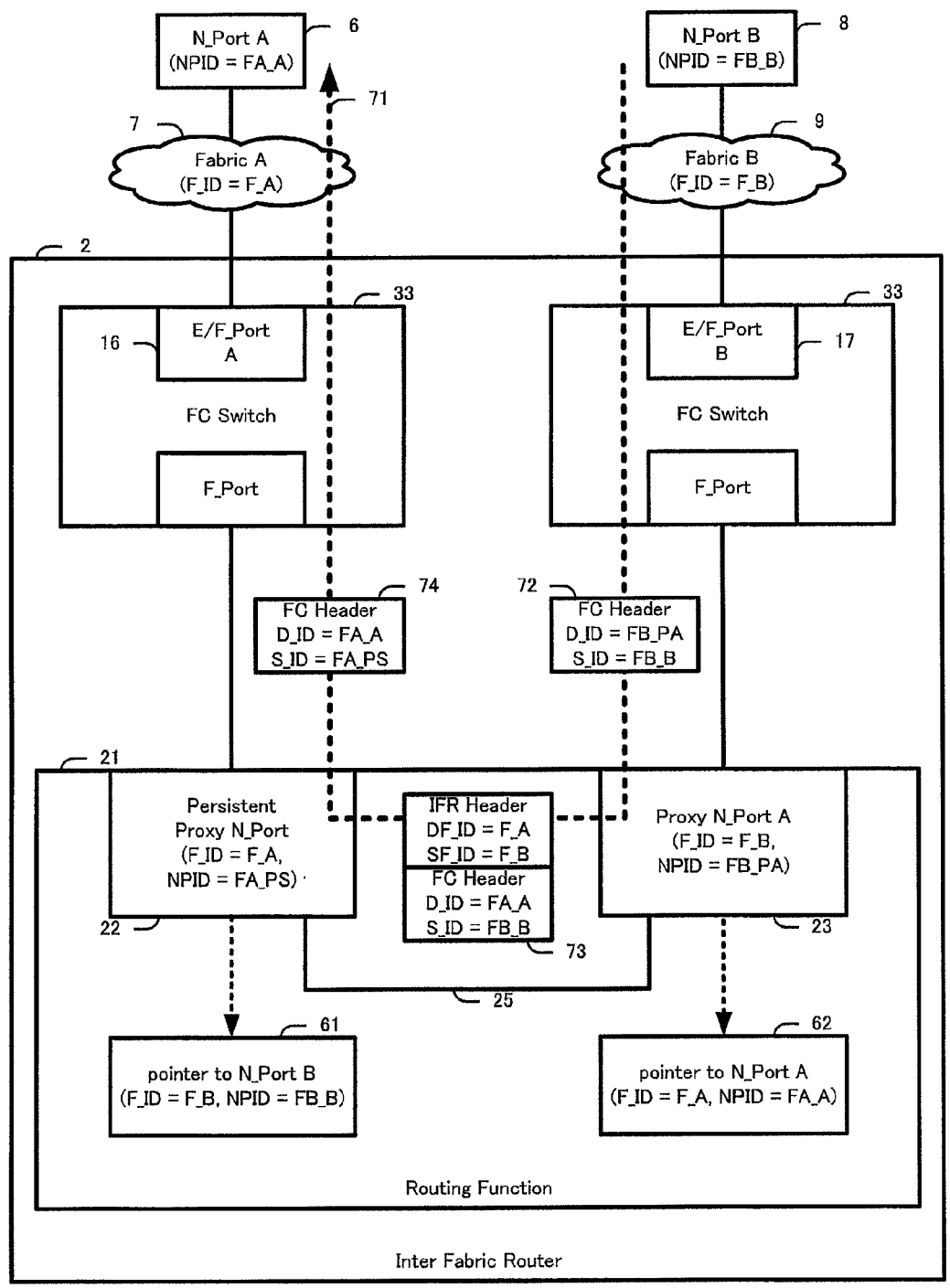
FIG. 6 is a diagram showing the path of an FC frame that is routed from the storage apparatus to the host.

FIG. 6 shows the path of an FC frame from the storage apparatus 3 to the host 1. Since the configuration is the same as that of FIG. 5 and only the frame routing direction differs, an explanation of the same components as FIG. 5 will be omitted.

An FC frame path 71 from the N_Port 8 of the storage apparatus 3 to the N_Port 6 of the host 1 will be explained. The N_Port 8 creates and routes an FC frame 72, which sets the N_Port ID of the proxy N_Port 23 to the D_ID 52 of the FC frame 51 and sets the N_Port ID of the N_Port 8 to the S_ID 53 of the FC frame 51.

The proxy N_Port 23 creates an expansion FC frame 73 to which is added the inter fabric router header (IFR Header) 58. Specifically, the proxy N_Port 23 converts the D_ID 52 in the received FC frame 72 to the N_Port ID of the N_Port 6 (FA_A) based on the information 62 of the N_Port pointed to by the proxy N_Port 23 (FB_PA). In addition, the proxy N_Port 23 adds the IFR header 58 to the D_ID 52-changed FC frame 72 so the routing function 21 is able to identify the destination fabric. Also, F_B, which is the F_ID of the fabric 9 to which the proxy N_Port 23 belongs, is set in the SF_ID 60 of the IFR header 58, and F_A, which is based on the information 62 of the N_Port being pointed to by the proxy N_Port 23, is set in the DF_ID 59 of the IFR header.

The expansion FC frame 73 that has been sent from the proxy N_Port 23 is routed from the second fabric 9 (F_ID=F_B) to the first fabric 7 (F_ID=F_A) by the routing function 21. In the expansion FC frame 73, the SF_ID 60 in the IFR Header 58 is set to F_B, and the S_ID 53 is set to FB_B. Therefore, the destination proxy N_Port is the persistent proxy N_Port 22, the contents of which match the information 61 (F_ID=F_B, NPID=FB_B).

The persistent proxy N_Port 22 removes the IFR header 58 from the received expansion FC frame 73, and creates an FC frame 74 from the FC frame from which the IFR header 58 was removed. The S_ID of this FC frame 74 is replaced with FA_PS, which is the N_Port ID of the persistent proxy N_Port 22. The persistent proxy N_Port 22 sends the FC frame 74 to the first fabric 7. The FC frame 74 arrives at the N_Port 6 that belongs to the first fabric 7.

Figure 7:
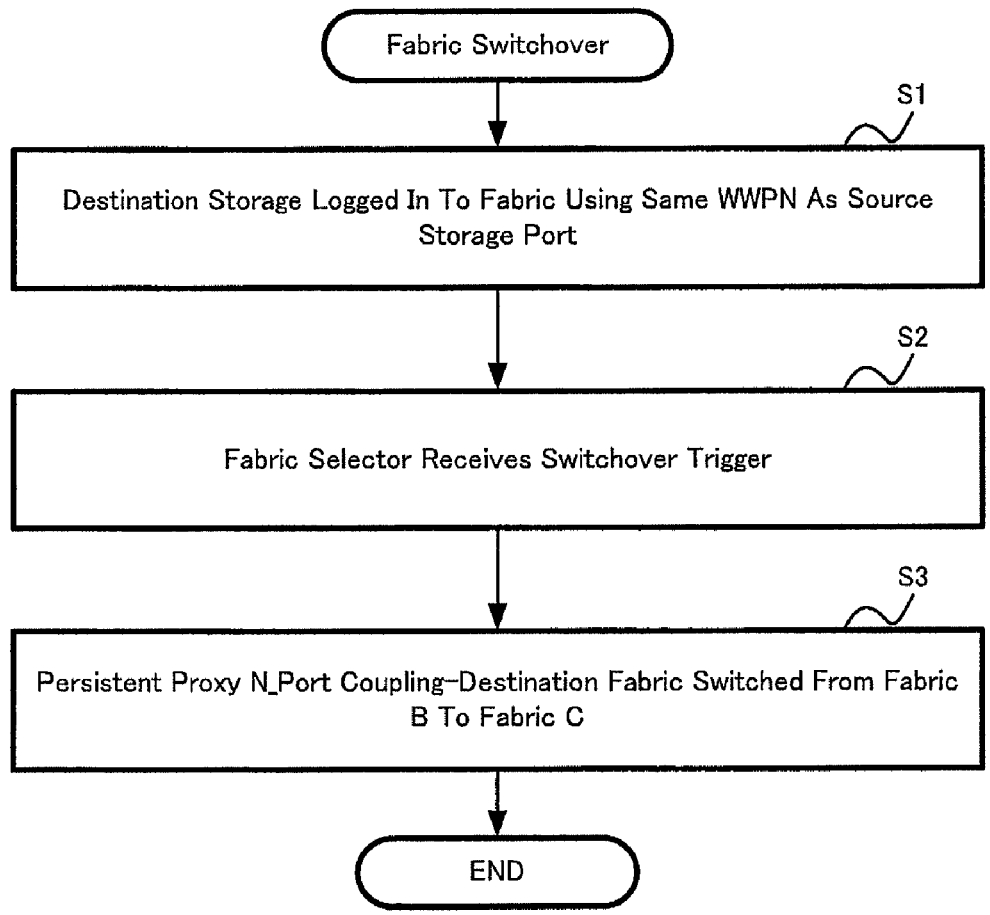
FIG. 7 is a flowchart of a switchover process of the inter fabric router.

FIG. 7 is a flowchart showing the switchover process of the inter fabric router 2. The process for migrating a N_Port from the source storage apparatus 3 to the destination storage apparatus 4 will be explained below.

The initial state prior to the switchover process (migration process) being started will be explained. In the initial state, the N_Port 6 of the host 1 is participating in the first fabric 7, the N_Port 8 of the source storage apparatus 3 is participating in the second fabric 9, and the path 25 of the inter fabric router 2 is active. The inter fabric router 2 is routing an IO request from the N_Port 6 of the host 1 to the N_Port 8 of the source storage apparatus 3. Furthermore, appropriate access control is being implemented for the respective fabrics 7, 9 by the WWPN-based zoning information, this zoning information is stored in the zoning information 39, and the access control of the inter fabric router 2 is implemented appropriately. Specifically, the settings are performed such that the WWPN of the N_Port 6 of the host 1 and the WWPN of the N_Port 8 of the source storage apparatus 3 are registered as a group in the zoning information 39 so as to enable communication between these WWPN only, and communication between various WWPN that are not registered in the zoning information 39 and communication with WWPN of a different group is not allowed. In this example, it is supposed that the above-described state is a precondition prior to the switchover process being started.

First of all, the N_Port 10 of the destination storage apparatus 4 sets the WWPN that is the same as WWPN_S, which is the WWPN of the N_Port 8, and performs a fabric login with respect to the third fabric 11 (Step S1).

The inter fabric router 2 detects the fact that the WWPN of the N_Port 8 and the WWPN of the N_Port 10, which are set to the same value, are duplicated across fabric 9 (F_B) and fabric 11 (F_C), which are different fabrics. The inter fabric router 2 allocates the path selection pair ID & state 45 to the routing table 36, and sets same in the tables of the states explained using FIGS. 3A through 3C.

Since the N_Port 6 of the host 1 is in the process of accessing N_Port 8 of the source storage apparatus 3 at this point, the N_Port being pointed to by the persistent proxy N_Port 22 is the N_Port 8. Therefore, the state is such that the FC frame cannot be routed to the N_Port 10 of the destination storage apparatus 4, which participated in the third fabric 11 afterward (Step S1).

Next, the fabric selector 35 receives a switchover trigger (Step S2). There are multiple examples of switchover trigger sources and occasions for issuing a switchover trigger. These will be explained in detail further below.

Next, the fabric selector 35 changes the routing table 36 in response to receiving the switchover trigger. Specifically, the fabric selector 35, upon receiving the switchover trigger, switches the routing path 25 to the N_Port 8 belonging to the second fabric 9 to the routing path 26 to N_Port 10 that belongs to the third fabric 11, and disconnects the routing path 25 (Step S3). The state of the post-switchover routing table 36 will be explained using FIG. 8.

FIGS. 8A through 8C show the routing table 36 of the inter fabric router 2. The differences with FIGS. 3A through 3C, which are the states of the post-switchover routing table 36, will be explained below.

The fabric selector 35 changes the routing table 36 in response to the switchover trigger. As shown in the portion 81 enclosed within the dotted line, the fabric selector 35 changes the F_ID to the N_Port ID (=FC_C) of the N_Port 10 that belongs to the third fabric 11 with respect to the information 43 of the N_Port being pointed to by the persistent proxy N_Port 22. Furthermore, the fabric selector 35 changes the state of the field corresponding to the Pair_ID=1 of the path selection pair ID & state 45 from the select second fabric 9 (F_B) state to the select third fabric 11 (F_C) state (dotted line-enclosed portion 82 of FIG. 8A, dotted line-enclosed portion 83 of FIG. 8B, and dotted line-enclosed portion 84 of FIG. 8C).

The routing destination of the FC frame from the persistent proxy N_Port 22 is changed to the N_Port 10 of the destination storage apparatus 4 due to the above-described updating of the routing table 36.

In the path selection pair ID & state "1", the third fabric 11 (F_C) is selected and the second fabric 9 (F_B) is not selected. Therefore, the routing control of the FC frame for the N_Port 6 is suspended in the proxy N_Port 23 (routing suspended). Alternatively, because the third fabric 11 (F_C) has been selected, the proxy N_Port 24 operates so as to route an FC frame to the N_Port 6.

Figure 9:
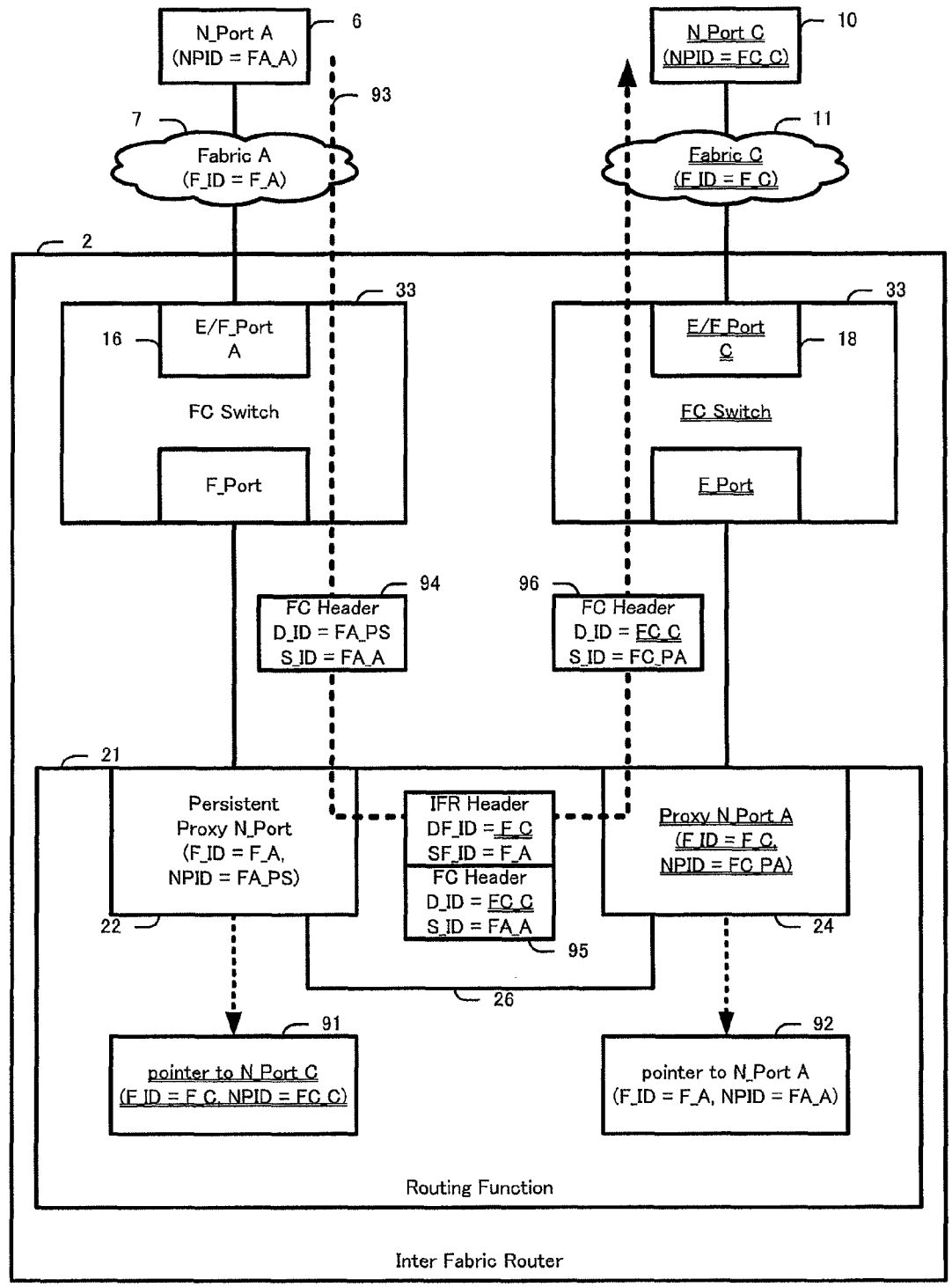
FIG. 9 is a diagram showing the path of an FC frame routed from the host to the storage apparatus subsequent to the switchover process.

FIG. 9 shows the path of an FC frame to be routed from the host 1 to the destination storage apparatus 4 subsequent to the switchover process. The explanation will focus on the points of difference with FIG. 5.

The persistent proxy N_Port 22 is the proxy port that points to the N_Port 10. In FIG. 9, the information 91 of the N_Port 10 being pointed to by the persistent proxy N_Port 22 is indicated. The content of the information 91 matches the field 43 (dotted line-enclosed portion 81) of the persistent proxy N_Port 22 of FIG. 8A. The proxy N_Port 24 is the proxy port that points to the N_Port 6. In FIG. 9, the information 92 of the N_Port 6 being pointed to by the proxy N_Port 24 is indicated. The content of the information 92 matches the field 43 of the proxy N_Port 24 of FIG. 8C.

An FC frame path 93 from the N_Port 6 of the host 1 to the N_Port 10 of the destination storage apparatus 4 will be explained. Since an FC frame 94 is the same as the FC frame 64 of FIG. 5, an explanation of this frame 94 will be omitted.

The persistent proxy N_Port 22 creates an IFR header 58-added expansion FC frame 95. Specifically, the persistent proxy N_Port 22 changes the D_ID 52 in the received FC frame 94 to the N_Port ID of the N_Port 10 (=FC_C) based on the information 91 of the N_Port being pointed to by the persistent proxy N_Port 22. In addition, the persistent proxy N_Port 22 adds the IFR header 58 to the D_ID 52-changed FC frame so that the routing function 21 is able to identify the destination fabric (F_ID=F_C). F_A, which is the F_ID of the fabric 7 to which the persistent proxy N_Port 22 belongs, is set in the SF_ID 60 of the IFR header 58. F_C is set in the DF_ID 59 of the IFR header 58 based on the information 91 of the N_Port 10 being pointed to by the persistent proxy N_Port 22.

The expansion FC frame 95 that has been sent from the persistent proxy N_Port 22 is routed from the first fabric 7 (F_A) to the third fabric 11 (F_C) by the routing function 21. In the expansion FC frame 95, the SF_ID is set to F_A and the S_ID is set to FA_A. Therefore, the destination proxy N_Port is the proxy N_Port 24, the content of which matches the information 92 (F_ID=F_A, NPID=FA_A). Note that the reason for not routing to the proxy N_Port 23 will be explained here. Since the proxy N_Port 23 belongs to the second fabric 9 (F_B), the proxy N_Port 23 does not match the DF_ID (=F_C) of the IFR header 58. Therefore, the proxy N_Port 23 does not become a candidate for the routing destination of the expansion FC frame 95.

The proxy N_Port 24 removes the IFR header 58 from the received expansion FC frame 95. The proxy N_Port 24 extracts an FC frame 96 from the FC frame from which the IFR header 58 has been removed. The S_ID of this FC frame 96 is changed to FC_PA, which is the N_Port ID of the proxy N_Port. The proxy N_Port 24 sends the FC frame 96 to the third fabric 11. The FC frame 96 arrives at the N_Port 10 that belongs to the third fabric 11.

Figure 10:
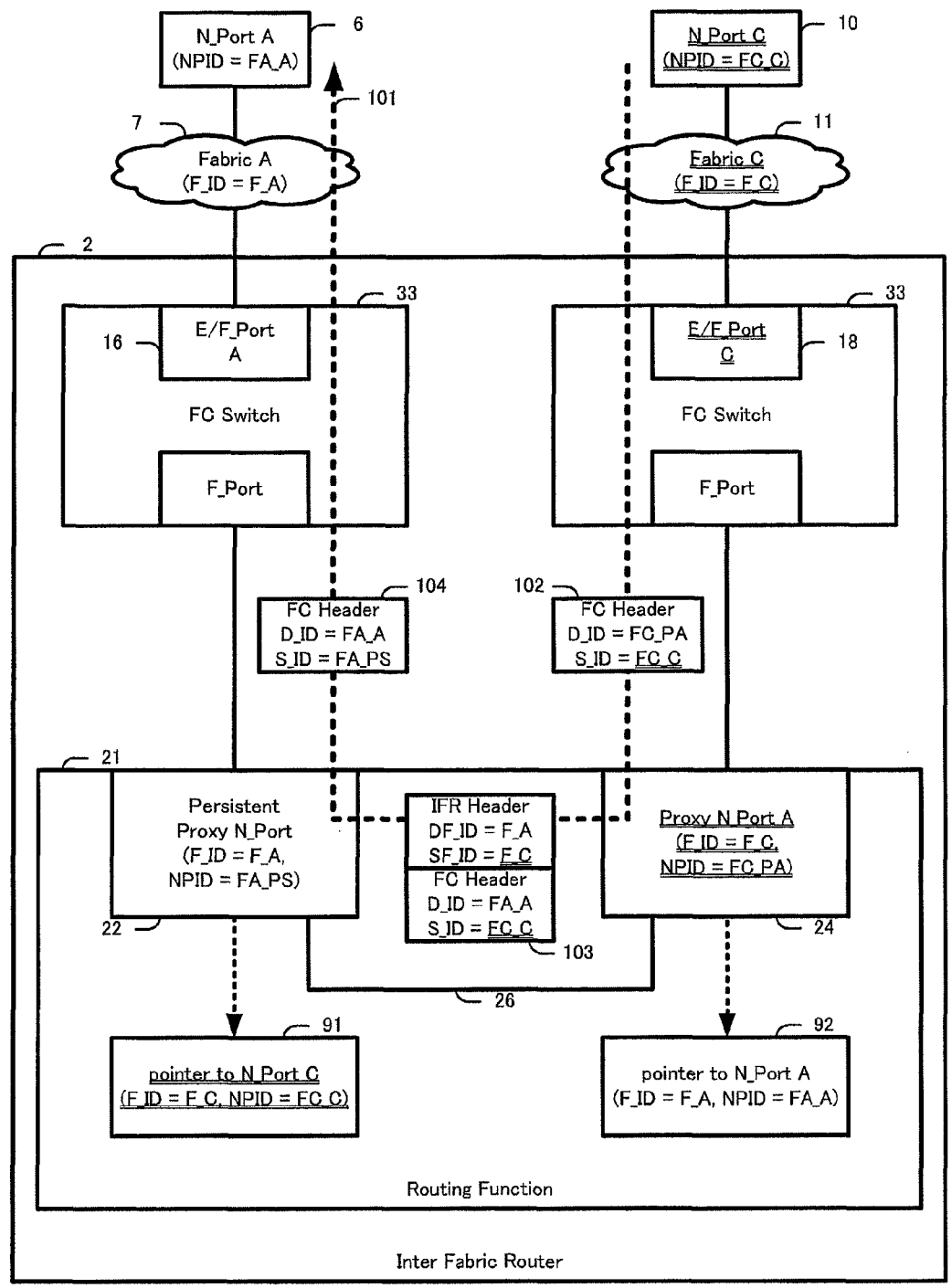
FIG. 10 is a diagram showing the path of an FC frame routed from the storage apparatus to the host subsequent to the switchover process.

FIG. 10 shows the path of an FC frame that is routed from the destination storage apparatus 4 to the host 1 subsequent to a switchover process. Since the configuration is the same as that of FIG. 9 and only the frame routing direction differs, the explanation will focus on the points of difference with FIG. 9.

An FC frame path 101 from the N_Port 10 of the destination storage apparatus 4 to the N_Port 6 of the host 1 will be explained. The N_Port 10 creates and sends an FC frame 102. In the FC frame 102, the N_Port ID of the proxy N_Port 24 is set in the D_ID 52, and the N_Port ID of the N_Port 10 is set in the S_ID 53.

The proxy N_Port 24 creates expansion FC frame 103 which added IFR header 58 to original received FC Frame 102. Specifically, the proxy N_Port 24 converts the D_ID 52 in the received FC frame 102 to the N_Port ID of the N_Port 6 based on the information 92 of the N_Port being pointed to by the proxy N_Port 24. In addition, the proxy N_Port 24 adds the IFR header 58 to the D_ID 52-changed FC frame 52 so the routing function 21 is able to identify the destination fabric. F_C, which is the F_ID of the fabric 11 to which the proxy N_Port 24 belongs, is set in the SF_ID 60 of the IFR header 58. F_A is set in the DF_ID 59 of the IFR header 58 based on the information 92 (F_ID=F_A, NPID=FA_A) of the N_Port 6 being pointed to by the proxy N_Port 24.

The expansion FC frame 103 that has been sent from the proxy N_Port 24 is routed from the third fabric 11 (F_C) to the first fabric 7 (F_A) by the routing function 21. In the expansion FC frame 103, the SF_ID is set to F_C and the S_ID is set to FC_C. Therefore, the routing destination proxy N_Port is the persistent proxy N_Port 22, the content of which matches the information 91.

The persistent proxy N_Port 22, upon receiving the expansion FC frame 103, removes the IFR header 58 from the expansion FC frame 103, and extracts an FC frame 104. The S_ID of the FC frame 104 is converted to FA_PS, which is the N_Port ID of the persistent proxy N_Port 22. The remainder of the explanation is the same as that of FIG. 6.

A variation of the first example will be explained below. Specifically, a method for sending a switchover trigger to the fabric selector 35 in the fabric switchover process explained using FIG. 7 will be explained using FIGS. 11 through 18.

Firstly, the prerequisites in FIGS. 11 through 18 will be explained. The N_Port 6 of the host 1 is already participating in the first fabric 7. Similarly, the N_Port 8 of the source storage apparatus 3 is already participating in the second fabric 9. The path 25 of the inter fabric router 2 is active. That is, the routing path 25 is valid. The inter fabric router 2 routes an IO request from the N_Port 6 of the host 1 to the N_Port 8 of the source storage apparatus 3. Appropriate access control is implemented with respect to the respective fabrics 7, 9 in accordance with WWPN-based zoning. Specifically, as zoning settings, the WWPN_A of the N_Port 6 of the host 1 and the WWPN_S of the N_Port 8 of the source storage apparatus 3 are registered in the zoning information 39 so as to belong to the same zoning group, and a N_Port having another WWPN is unable to access this N_Port 6 and N_Port 8. It is supposed that the above-described state is a prerequisite of the initial state prior to the start of the switchover process. An explanation of this prerequisite will be omitted from the explanations of the flowcharts of FIGS. 11 through 18.

Figure 11:
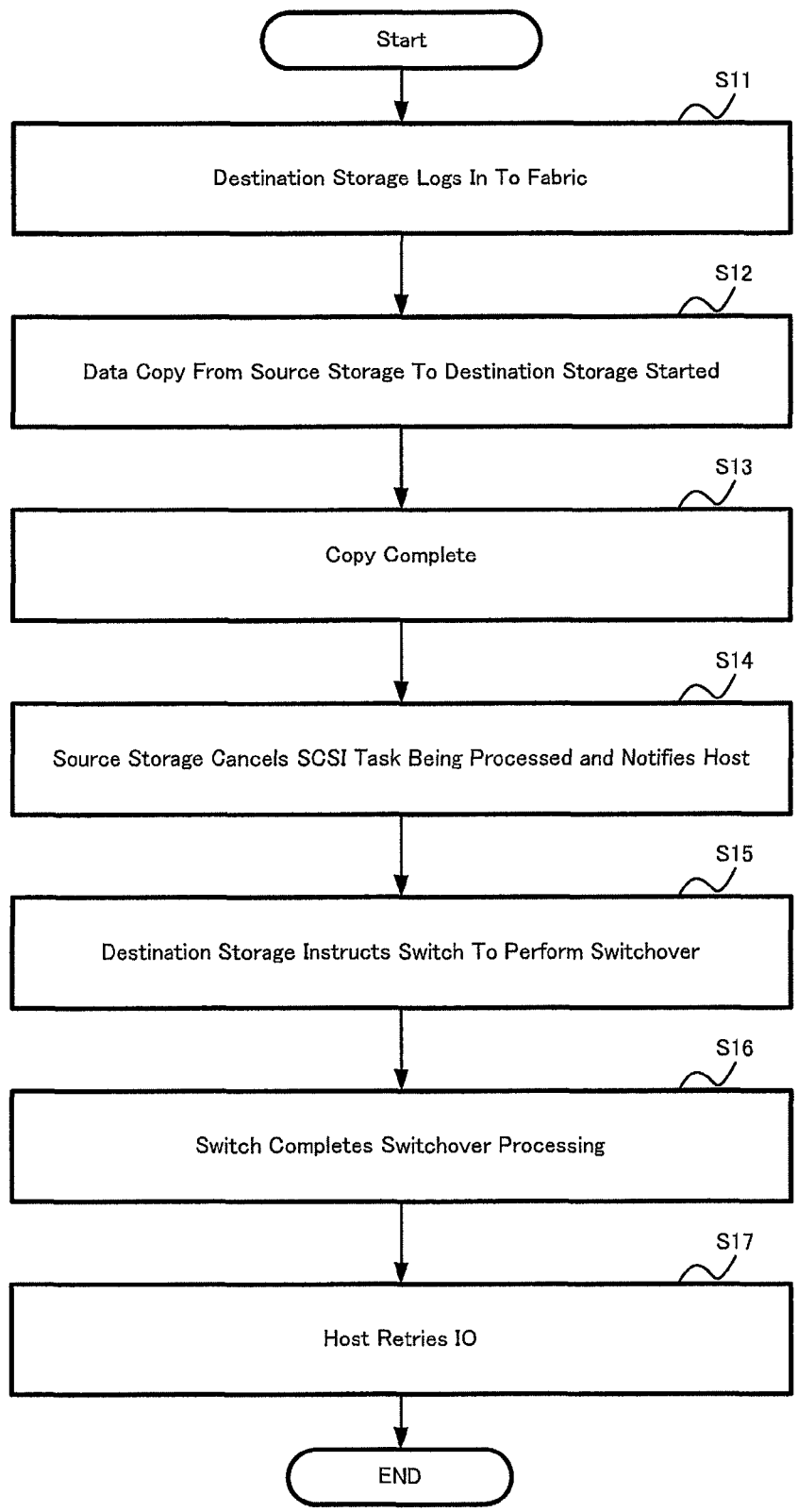
FIG. 11 is a flowchart of a post-volume migration storage migration process in accordance with a destination storage apparatus instruction.

FIG. 11 is a flowchart of a case in which, subsequent to migrating a logical volume 15 from the source storage apparatus 3 to the destination storage apparatus 4, the destination storage apparatus 4 issues a switchover instruction (a switchover trigger) to the inter fabric router 2.

First, the N_Port 10 of the destination storage apparatus 4 logs in to the third fabric 11 using the same WWPN as WWPN_S, which is the WWPN of the N_Port 8 (Step S11). The inter fabric router 2 detects the fact that the WWPN of the N_Port 8 and the WWPN of the N_Port 10 are the same, and that the N_Port 8 and the N_Port 10 belong to different fabrics, i.e., fabric 9 (F_B) and fabric 11 (F_C). Therefore, the inter fabric router 2 allocates the path selection pair ID & state 45 to the routing table 36, and sets same in the tables of the states explained using FIGS. 3A through 3C.

Since the N_Port 6 of the host 1 is in the process of accessing N_Port 8 of the source storage apparatus 3 at this point, the N_Port being pointed to by the persistent proxy N_Port 22 is the N_Port 8. Therefore, the FC frame cannot be routed to the N_Port 10 of the destination storage apparatus 4, which participated in the third fabric 11 afterward (Step S11).

Next, the data of the logical volume 15 of the source storage apparatus 3 is copied to a logical volume (not shown in the drawing) in the destination storage apparatus 4 via the path 14 (Step S12). It is supposed here that the inter-volume data copy is started in accordance with an instruction of the destination storage apparatus 4. The storage apparatus that initiates the data copy issues a switchover instruction to the inter fabric router 2 in Step S15, which will be explained below. The configuration may also be such that the source storage apparatus 3 takes the initiative and executes the data copy of the logical volume 15. In such a case, the switchover instruction is issued to the inter fabric router 2 from the source storage apparatus 3 in Step S15.

Next, the data copy explained in Step S12 is completed (Step S13).

In response to the data copy being completed in Step S13, the source storage apparatus 3 clears an in-progress SCSI task (SCSI command) that the switchover-target N_Port 8 received from the N_Port 6 of the host 1 in accordance with an SCSI task management set (for example, the Clear Task Set Task Management Function) (Step S14). The source storage apparatus 3 notifies the host 1 that the SCSI task has been cleared using a SCSI Unit Attention (Step S14).

As a different method, the source storage apparatus 3 is also able to process the SCSI task using the ABTS (Abort Sequence) of the FC Basic Link Service. Or, the configuration may also be such that the host 1 checks whether the source storage apparatus 3 SCSI task was cleared by querying the state of the source storage apparatus 3. That is, the host 1 may implement a sense response in accordance with a SCSI Response Check Condition that implements a retry.

In response to the data copy being completed in Step S13, the destination storage apparatus 4 instructs the inter fabric router 2 to implement a switchover (Step S15). Specifically, the destination storage apparatus 4 sends a switchover trigger message to the fabric selector 35 via the management port 19 of the inter fabric router 2 and the management network 20.

Or, the destination storage apparatus 4 is also able to instruct the fabric selector 35 to implement a switchover via the third fabric 11 from the N_Port 10 (Step S15). In this instruction, for example, it is possible to use either a vendor-unique request or message, such as either an FC Extended Link Service or a FC Generic Service.

The fabric selector 35, upon receiving the switchover trigger, replaces the routing table 36. Specifically, the fabric selector 35 switches from the routing path 25 to the N_Port 8 that belongs to the second fabric 9 to the routing path 26 to the N_Port 10 that belongs to the third fabric 11, and disconnects the routing path 25 (Step S16). The state of the post-update routing table 36 is the same as was explained using FIG. 8.

The N_Port 6 of the host 1 attempts a retry of the SCSI command for which processing was cancelled (Step S17). The retried SCSI command arrives at the N_Port 10 of the destination storage apparatus 4 via the frame routing path 26. Due to this, the host 1 IO request is processed having the logical volume 15 that was migrated to the destination storage apparatus 4 as the target.

Furthermore, the sequence of the Steps S11, S12 and S13 may be changed. That is, the timing of the destination storage apparatus 4 login to the third fabric 11 may take place at any time prior to Step S14.

Figure 12:
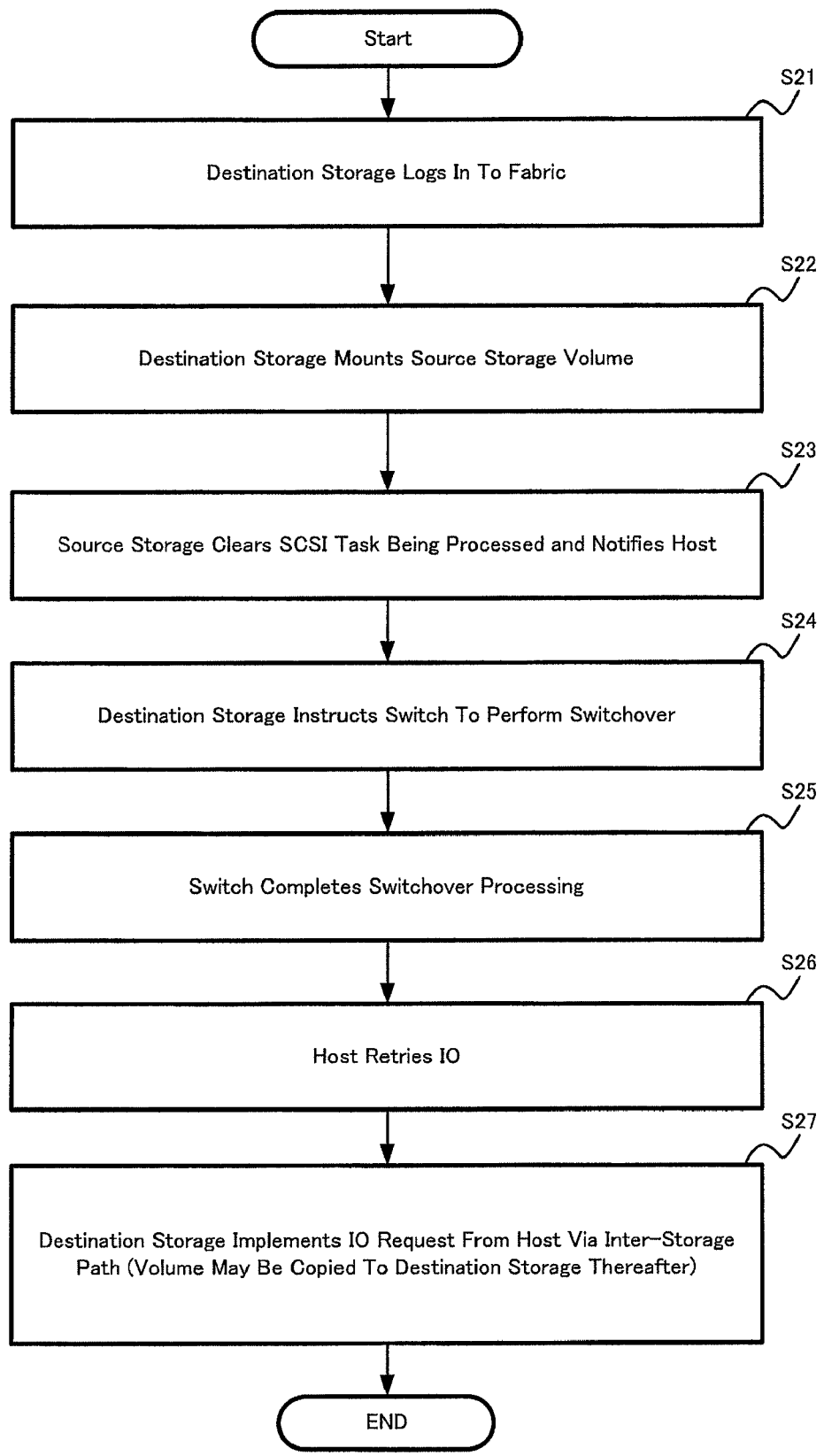
FIG. 12 is a flowchart of a pre-volume migration storage migration process in accordance with the destination storage apparatus instruction.

FIG. 12 is a flowchart of a process in which the source storage apparatus 4 issues a switchover instruction to the inter fabric router 2. The explanation will focus on the points of difference with the flowchart of FIG. 11.

First, the same processing as that of Step S11 is implemented (Step S21).

Next, the destination storage apparatus 4 mounts the logical volume 15 of the source storage apparatus 3 using the path 14 (Step S22). The fact that a data migration does not occur in this mounting process differs from the processing shown in FIG. 11. That is, the destination storage apparatus 4 mounts the logical volume 15 of the source storage apparatus 3 and uses this logical volume 15 just like it is a logical volume of the destination storage apparatus 4.

Next, the processing explained in Step S14 is implemented (Step S23). Next, the processing explained in Step S15 is implemented (Step S24). Next, the processing explained in Step S16 is implemented (Step S25). Next, the processing explained in Step S17 is implemented (Step S26).

Lastly, the destination storage apparatus 4 routes the IO request received from the host 1 to the source storage apparatus 3 using the path 14. The source storage apparatus 3, which received the routed IO request, implements the IO request with respect to the logical volume 15. A notification to the effect that the IO request processing has been completed and the processing result are sent to the destination storage apparatus 4 from the source storage apparatus 3 via the path 14. The destination storage apparatus 4 returns a message to the effect that the IO request processing has been completed and the IO processing result to the host 1 in accordance with the IO request result received from the source storage apparatus 3 (Step S27).

The data of the logical volume 15 of the source storage apparatus 3 may be copied to the logical volume of the destination storage apparatus 4 at the time of Step S27 or later. That is, at the outset of the switchover, the destination storage apparatus 4 mounts the logical volume 15 of the source storage apparatus 3, and rapidly processes the IO request being retried from the host 1. At a predetermined timing subsequent to the switchover, the data of the logical volume 15 is copied from the source storage apparatus 3 to the destination storage apparatus 4. Due to this, responsiveness can be heightened without the need to send the IO request from the host 1 to the source storage apparatus 3.

Furthermore, the order of Steps S21 and S22 may be reversed.

Figure 13:
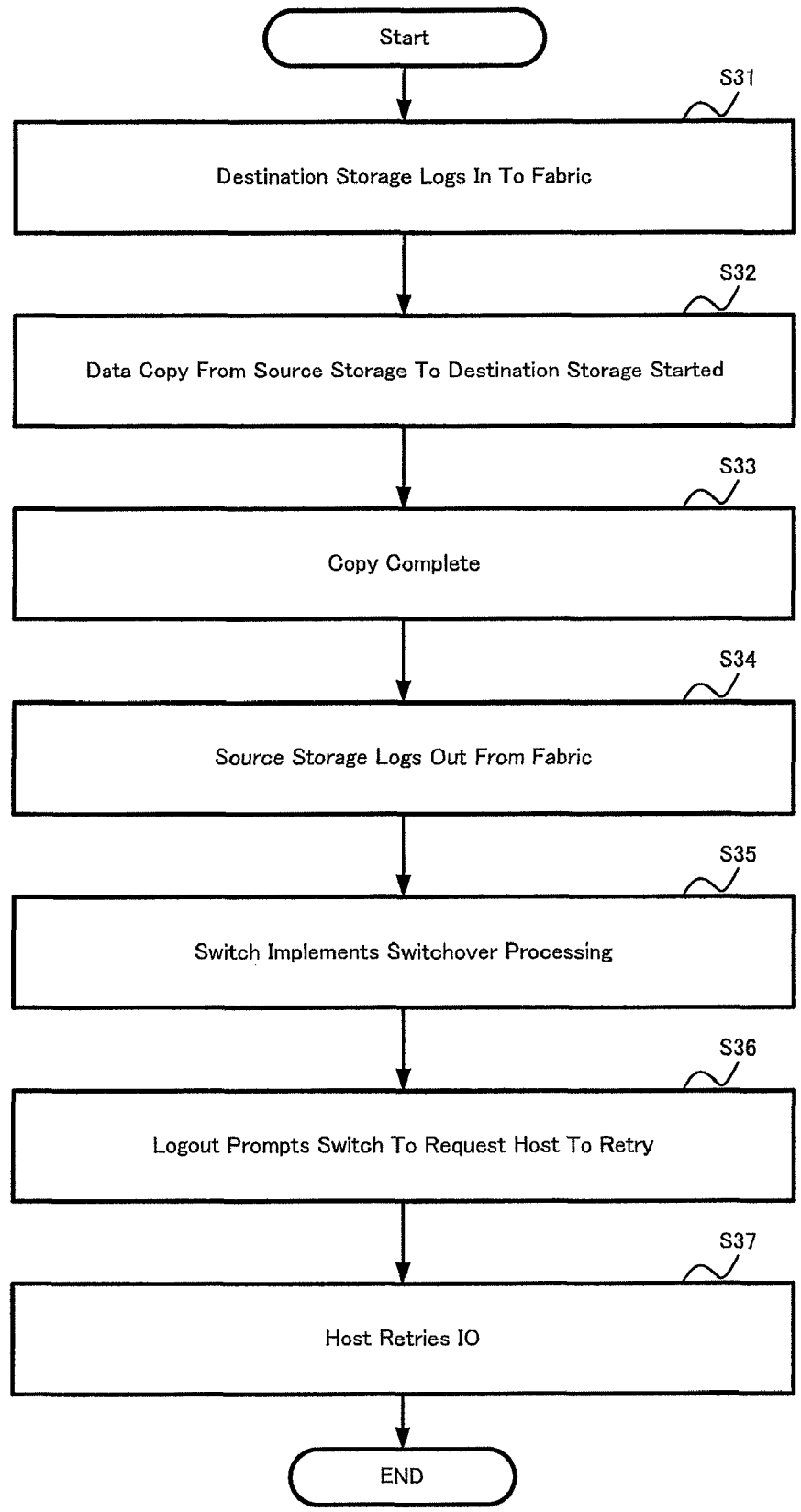
FIG. 13 is a flowchart of a post-volume migration storage migration process triggered by the separation of a source storage apparatus from a switch.

FIG. 13 is a flowchart showing a process for issuing a switchover instruction to the inter fabric router 2 in response to a source storage apparatus 3 operation. Processing that duplicates the contents explained using FIGS. 11 and 12 will be briefly explained.

First, the same processing as that of Step S11 is implemented (Step S31). Next, the processing explained in Step S12 is implemented (Step S32). Next, the processing explained in Step S13 is implemented (Step S33).

The N_Port 8 of the source storage apparatus 3 logs out from the second fabric 9 (Step S34). When the N_Port 8 performs a fabric logout (FLOGO), the nameserver (not shown in the drawing) of the respective FC switches that belong to the fabric 9 deletes the logged out N_Port 8 from the nameserver. The fabric selector 35 of the inter fabric router 2 removes the N_Port 8 entry of the routing table 36 based on the nameserver information update (Step S34).

The fabric selector 35 implements the processing explained in Step S16 in response to fabric logout of the source storage apparatus 3 (Step S35).

The inter fabric router 2 requests that the N_Port 6 of the host 1 attempt a retry in response to the logout of the source storage apparatus 3 (Step S36).

The host 1, upon receiving the notification of Step S35, retries the IO request (Step S37). Since the path is switched to the frame routing path 26 in Step S35, the IO request reissued by the host 1 is routed to the N_Port 10 of the destination storage apparatus 4 (Step S37).

Furthermore, the sequence of Steps S31, S32 and S33 may be changed.

Figure 14:
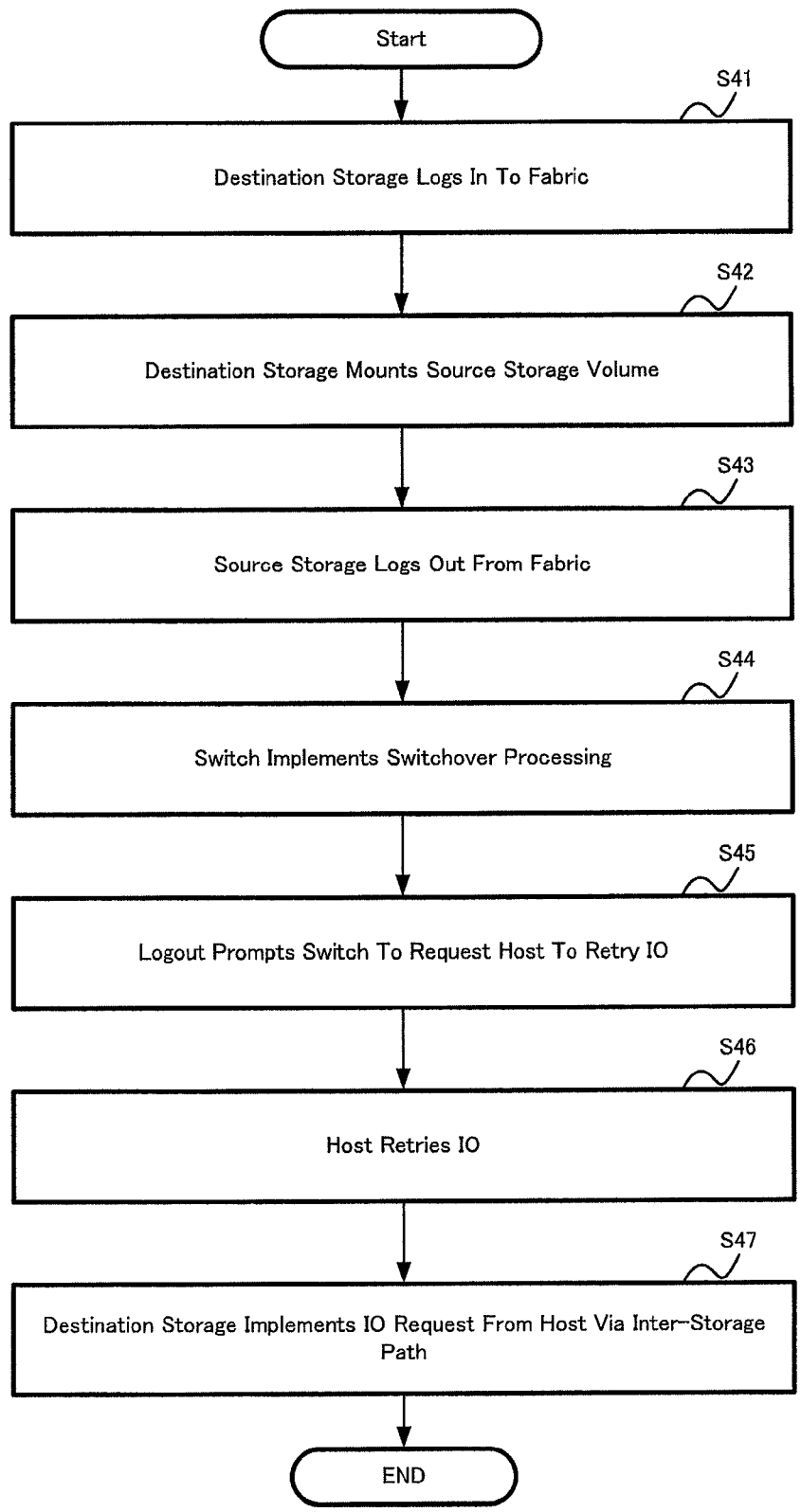
FIG. 14 is a flowchart of a pre-volume migration storage migration process triggered by the separation of the source storage apparatus from the switch (fabric).

FIG. 14 is a flowchart showing a process for issuing a switchover instruction to the inter fabric router 2 in response to a source storage apparatus 3 operation. In the flowchart shown in FIG. 13, a case in which the data of the logical volume 15 of the source storage apparatus 3 is copied to the logical volume 1 in the destination storage apparatus 4 was explained. Alternatively, in the flowchart shown in FIG. 14, the destination storage apparatus 4 mounts the logical volume 15 of the source storage apparatus 3. The processing that duplicates the contents explained in the flowcharts of FIGS. 11 through 13 will be briefly explained.

First, the same processing as that of Step S11 is implemented (Step S41). Next, the processing explained in Step S22 is implemented (Step S42). Next, the processing explained in Step S34 is implemented (Step S43). Next, the processing explained in Step S16 is implemented (Step S44). Next, the processing explained in Step S36 is implemented (Step S45). Next, the processing explained in Step S37 is implemented (Step S46). Lastly, the processing explained in Step S27 is implemented (Step S47).

Furthermore, the sequence of Steps S41 and S42 may be changed.

Figure 15:
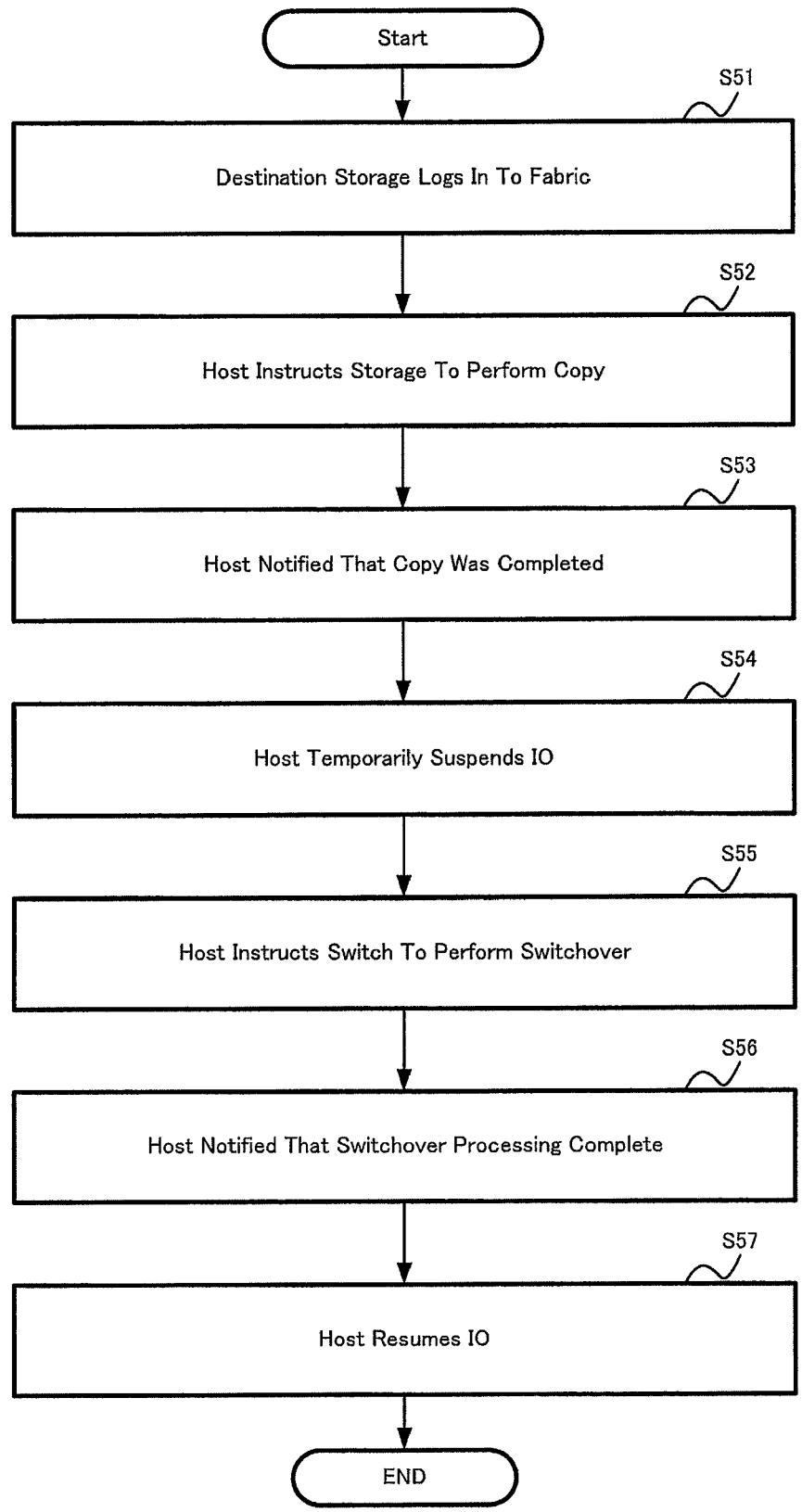
FIG. 15 is a flowchart of a post-volume migration storage migration process in accordance with a host instruction.

FIG. 15 is a flowchart of a case in which the host 1 issues a switchover instruction to the inter fabric router 2. Since the processing resembles that explained using FIG. 11, an overview explanation will be given.

First, the same processing as that of Step S11 is implemented (Step S51). Next, the logical volume 15 migration process explained in Step S12 is implemented in accordance with the instruction from the host 1 (Step S52). Either one of the source storage apparatus 3 or the destination storage apparatus 4 notifies the host 1 that the logical volume migration has been completed (Step S53).

The host 1 suspends the IO request to the source storage apparatus 3 (Step S54). The host 1 instructs the inter fabric router 2 to perform a switchover (Step S55). The host 1 receives a notification from the inter fabric router 2 to the effect that the switchover process has been completed (Step S56). Lastly, the host 1 resumes the IO processing that had been cancelled (Step S57). The IO request from the host 1 is sent to the N_Port 10 of the destination storage apparatus 4 via the frame routing path 26 (Step S57).

Furthermore, the sequence of Steps S51, S52 and S53 may be changed. The destination storage apparatus 4 can be logged in to the third fabric 11 any time before the host 1 suspends the IO request.

Figure 16:
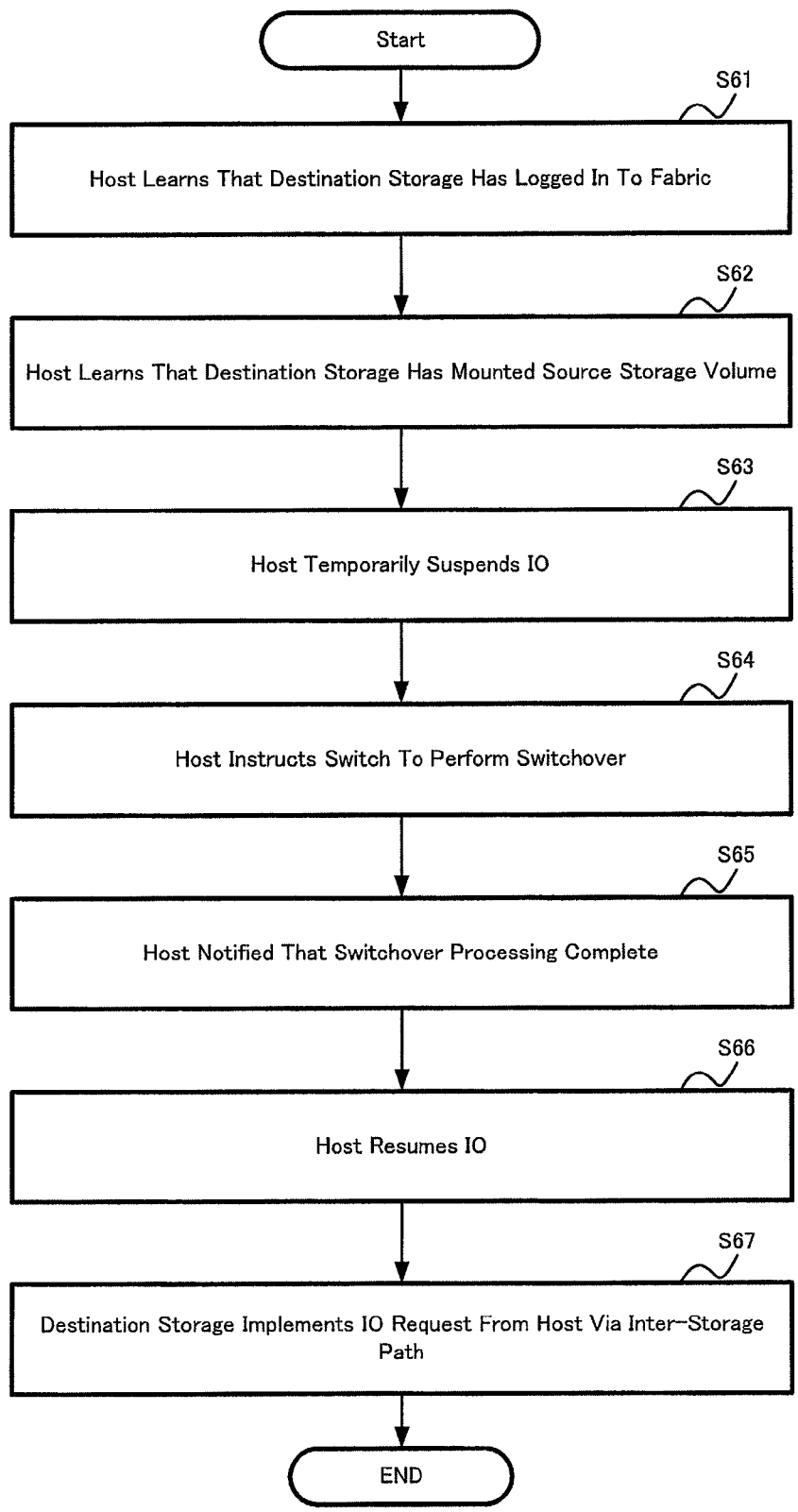
FIG. 16 is a flowchart of a pre-volume migration storage migration process in accordance with the host instruction.

FIG. 16 shows another example in which the host 1 issues a switchover instruction to the inter fabric router 2. Since the processing resembles that explained using FIGS. 12 and 15, the explanation will focus on the points of difference.

First, the host 1 learns via the management computer 5 that the destination storage apparatus 4 has logged in to the third fabric 11 (Step S61). The host 1 learns via the management computer 5 that the destination storage apparatus 4 has mounted the logical volume 15 of the source storage apparatus 3 (Step S62).

Next, the host 1 suspends an IO request to the source storage apparatus 3 as was explained in Step S54 (Step S63). Next, the processing explained in Step S55 is implemented (Step S64). Next, the processing explained in Step S56 is implemented (Step S65). Next, the processing explained in Step S57 is implemented (Step S66). Lastly, the processing explained in Step S27 is implemented (Step S67).

Figure 17:
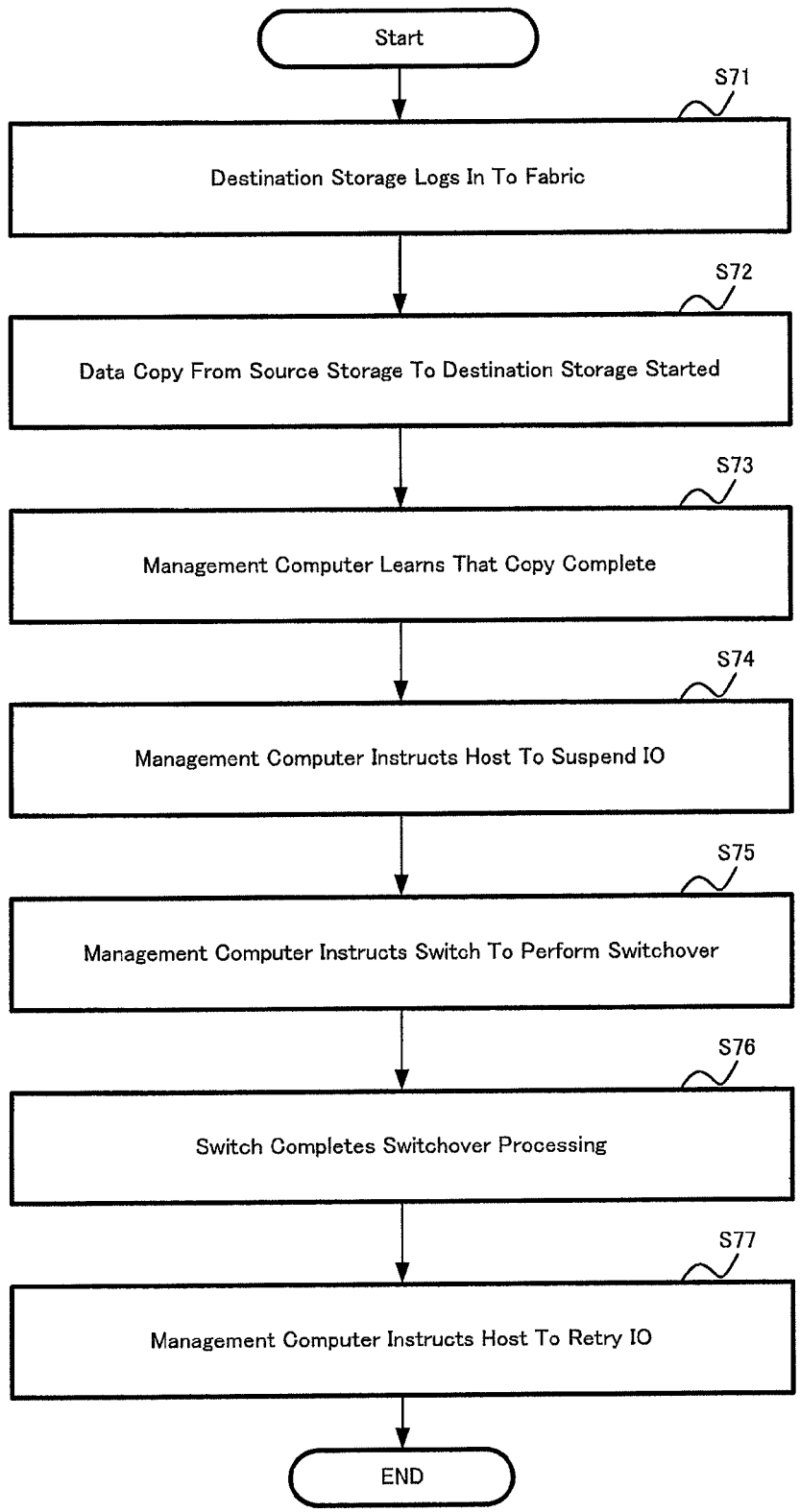
FIG. 17 is a flowchart of a post-volume migration storage migration process in accordance with a management computer instruction.

FIG. 17 is a flowchart in which the management computer 5 issues a switchover instruction to the inter fabric router 2. Since the processing resembles that explained using FIG. 15, an overview explanation will be given.

First, the same processing as that of Step S11 is implemented (Step S71). Next, the logical volume 15 migration process explained in Step S12 is implemented in accordance with the instruction from the management computer 5 (Step S72). Either one of the source storage apparatus 3 or the destination storage apparatus 4 notifies the management computer 5 that the logical volume migration has been completed (Step S73).

The management computer 5 instructs the host 1 to suspend an IO request to the source storage apparatus 3 (Step S74). The management computer 5 instructs the inter fabric router 2 to perform a switchover (Step S75). The management computer 5 receives a notification from the inter fabric router 2 to the effect that the switchover process has been completed (Step S76). Lastly, the management computer 5 instructs the host 1 to resume the IO processing that had been cancelled by the host 1 (Step S77). The IO request from the host 1 is sent to the N_Port 10 of the destination storage apparatus 4 via the frame routing path 26.

Furthermore, the sequence of the Steps S71, S72 and S73 may be changed. The destination storage apparatus 4 can be logged in to the third fabric 11 any time before the host 1 suspends the IO request.

Figure 18:
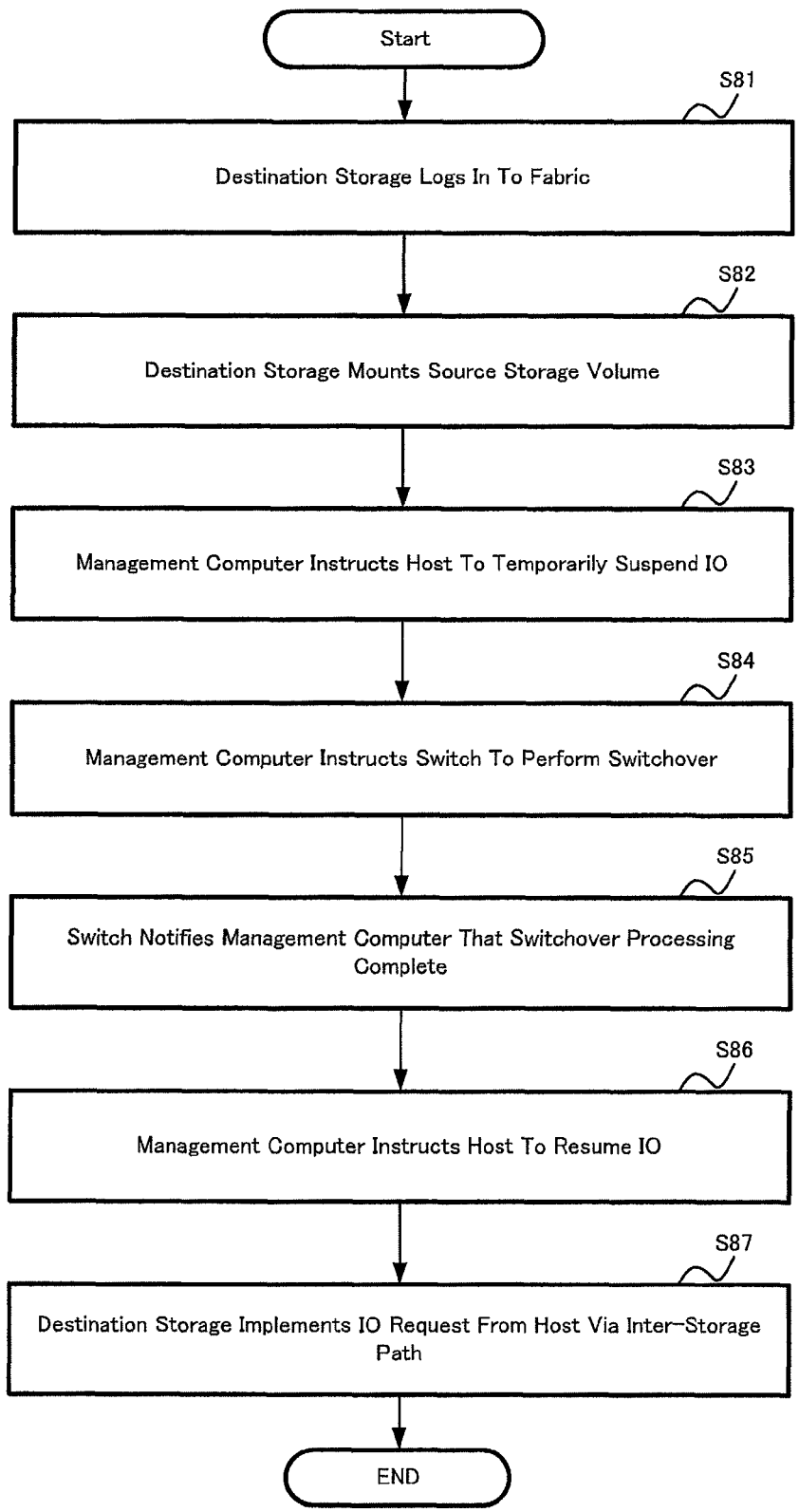
FIG. 18 is a flowchart of a pre-volume migration storage migration process in accordance with the management computer instruction.

FIG. 18 shows another example in which the management computer 5 issues a switchover instruction to the inter fabric router 2. Since the processing resembles that explained using FIG. 16, an overview explanation will be given.

First, the same processing as that of Step S11 is implemented (Step S81). Next, the processing explained in Step S22 is implemented in accordance with an instruction from the management computer 5 (Step S82). Next, the processing explained in Step S63 is implemented in accordance with an instruction from the management computer 5 (Step S83).

Next, the processing explained in Step S64 is implemented in accordance with an instruction from the management computer 5 (Step S84). The management computer 5 receives a notification from the inter fabric router 2 to the effect that the switchover process has been completed (Step S85). Next, the processing explained in Step S57 is implemented in accordance with an instruction from the management computer 5 (Step S86). Lastly, the processing explained in Step S27 is implemented (Step S87).

Furthermore, the sequence of the Steps S81, S82 and S83 may be changed. The destination storage apparatus 4 can be logged in to the third fabric 11 at any time prior to the management computer 5 issuing the switchover instruction to the inter fabric router 2.

As explained hereinabove, in this example, the same WWPN as that of the source N_Port 8 of the source storage apparatus 3 is set beforehand in the destination N_Port 10 of the destination storage apparatus 4, and the destination storage apparatus 4 is logged in beforehand to the third fabric 11, which is separated from the first fabric 7 and the second fabric 9. When a switchover instruction (switchover trigger) is issued from a switchover instruction source (any of the source storage apparatus 3, the destination storage apparatus 4, the host 1, or the management computer 5), and the fabric selector 35 rewrites the routing table 36.

When the routing table 36 is rewritten, the routing path is switched from the routing path 25, which couples the first fabric 7 and the second fabric 9, to the routing path 26, which couples the first fabric 7 and the third fabric 11. Therefore, in this example, the path from the source storage apparatus 3 to the destination storage apparatus 4 can be switched rapidly without changing the WWPN-based zoning setting before or after the migration.

The effects of this example will be explained. The user is able to migrate a storage apparatus without changing the access control represented by the SAN zoning. In the case of the prior art, it is necessary to change the SAN zoning in accordance with the migration. Therefore, in the case of the prior art, IOs between hosts and storage apparatuses, which belong to all the fabrics comprising ports unrelated to the migration, are cancelled, and the user must reset the access control at the time of a storage apparatus migration.

In addition, in this example, the path is switched over after allowing the destination storage apparatus 4 to participate in the fabric beforehand. Therefore, it is possible to implement a storage apparatus migration in a state in which procedures, such as an FC linkup and the registration of an FC switch in a nameserver needed to participate in an FC fabric, have been completed in advance. For this reason, since more of the procedures that are implemented during the cancellation of the host 1 IO request can be omitted than in the prior art, it is possible to shorten the host IO cancellation time more than in the past when migrating a storage apparatus.

Furthermore, in a case where a virtual machine on one host is migrated to another host, problems can be limited to the migration-targeted hosts alone, also making it possible for the migration-targeted host itself to make a determination about IO request suspension. Therefore, problems, such as shortening the IO request suspension time as described hereinabove and the administrator implementing wide-ranging zoning resettings, do not occur.

EXAMPLE 2

Figure 19:
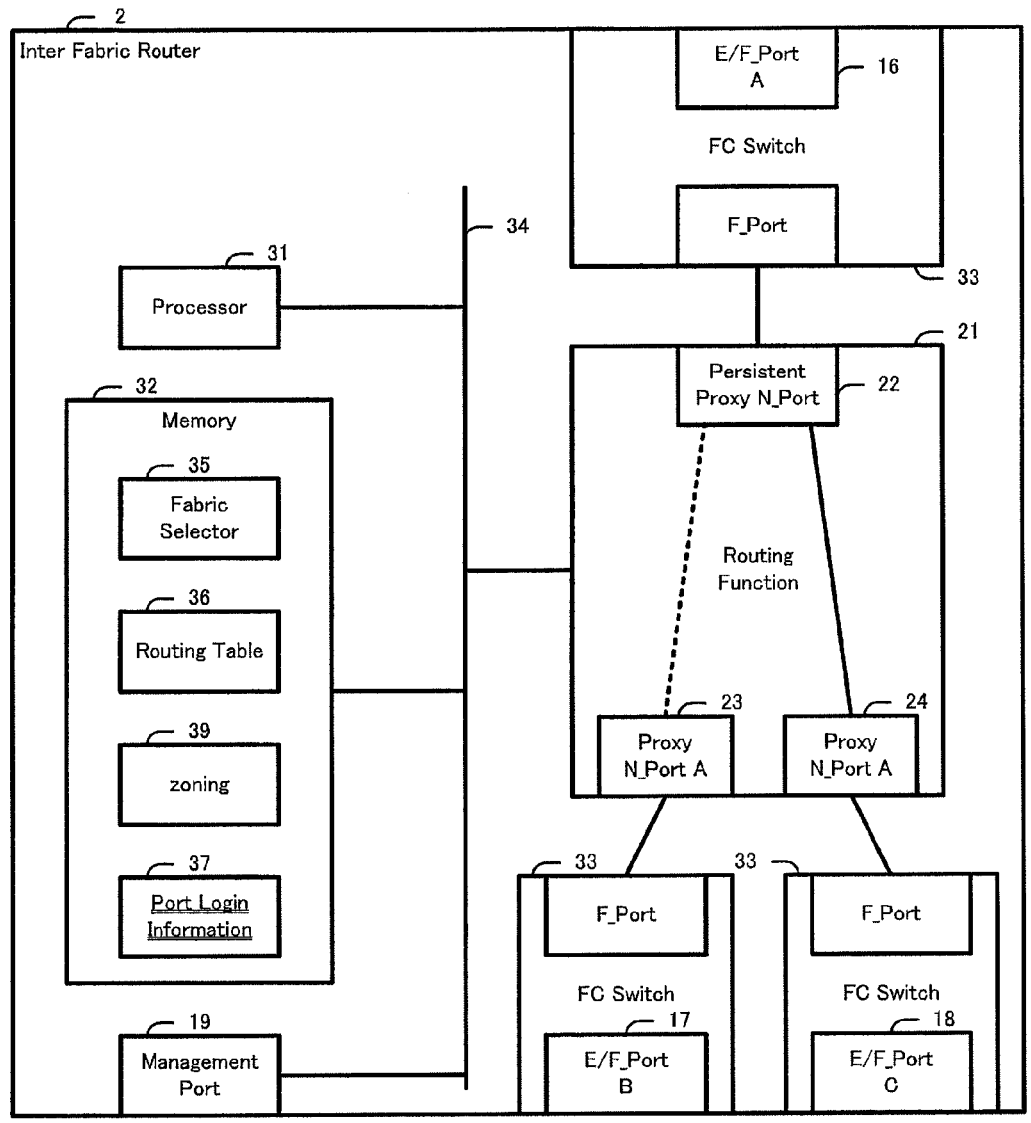
FIG. 19 is a diagram showing the routing table of an inter fabric router related to a second example.

A second example will be explained by referring to FIGS. 19 and 20. FIG. 19 shows a configuration of the inter fabric router 2. The explanation will focus on the points of difference with FIG. 2.

In the inter fabric router 2 shown in FIG. 19, port login information 37 is held in the memory 32. The fabric selector 35 acquires port login (PLOGI) and process login (PRLI) information exchanged between the N_Port 6 of the host 1 and the N_Port of the storage apparatus, and records same in the port login information 37. The port login and the process login are FC initialization procedures. The fabric selector 35 monitors for the sending and receiving of port login and process login requests and responses, and records the acquired information in the port login information 37.

To eliminate the need for initialization procedures such as an FC port login from the host 1 subsequent to a switchover process, in this example, the proxy N_Port of the inter fabric router 2 implements the PLOGI and PRLI processing by proxy. The fabric selector 35 utilizes the port login information 37 for this purpose. This will be explained in detail using the flowchart of FIG. 20.

Figure 20:
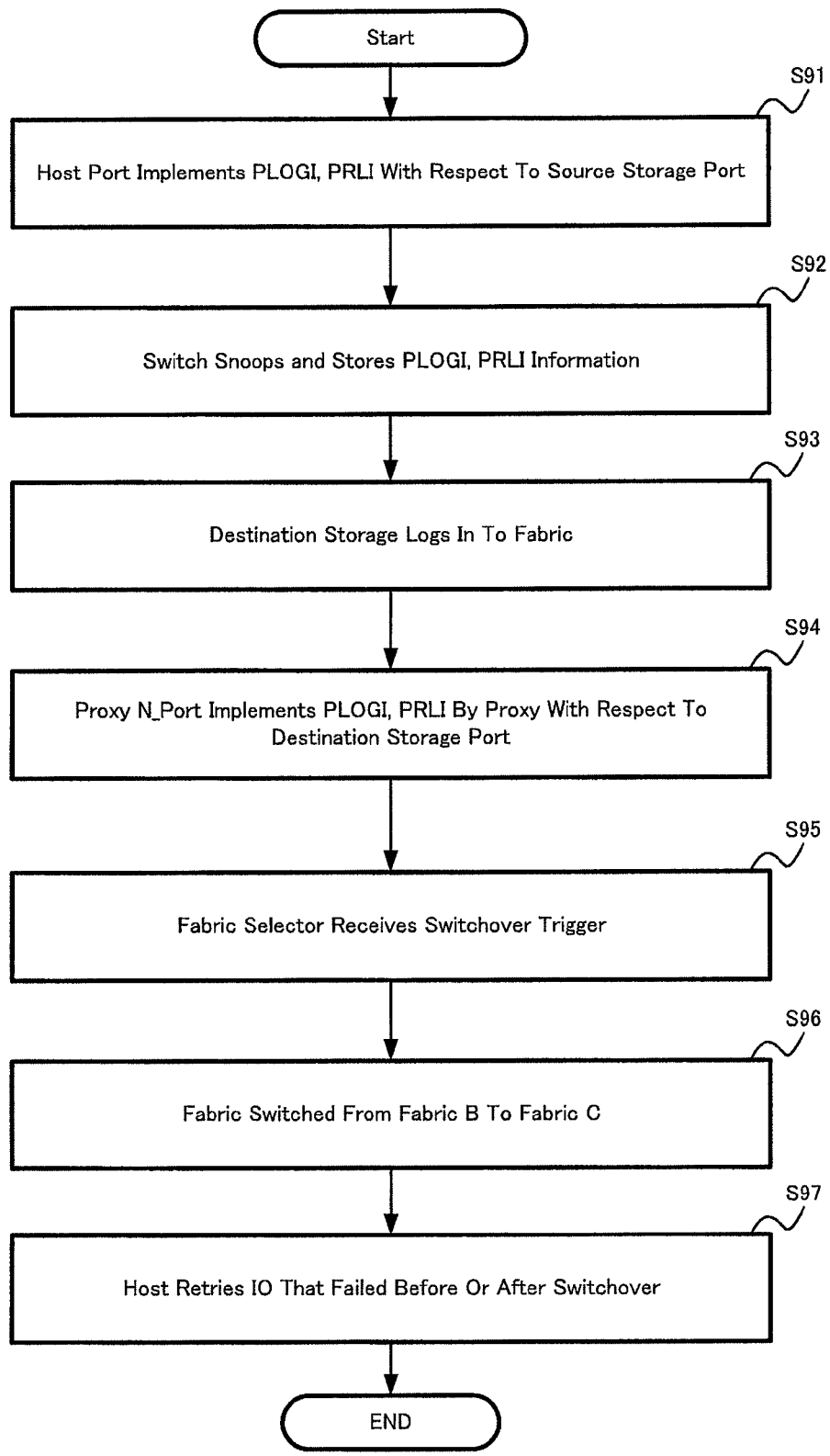
FIG. 20 is a flowchart showing a storage migration process in which the switch implements a login to the destination storage apparatus by proxy.

FIG. 20 is a flowchart in which the inter fabric router 2 (switch) logs in to the storage apparatus and implements a storage migration process on behalf of the host 1. In FIG. 20, the explanation will focus on the points of difference with the configuration described in the first example.

The prerequisite state will be explained. The inter fabric router 2 selects the frame routing path 25. It is supposed that this is done prior to the host 1 and the source storage apparatus 3 implementing the FC initialization. The N_Port 6 of the host 1 has completed fabric login to the first fabric 7. Similarly, the N_Port 8 of the source storage apparatus 3 has completed fabric login to the second fabric 9. The N_Port 10 of the destination storage apparatus 4 has completed fabric login to the third fabric 11.

The flowchart of FIG. 20 will be explained. First, the N_Port 6 of the host 1 implements a port login (PLOGI) and a process login (PRLI) with respect to the N_Port 8 of the source storage apparatus 3 (Step S91).

The fabric selector 35 of the inter fabric router 2 snoops the information of the port login and the process login that transited the routing function 21, and register same in the port login information 37 (Step S92).

The N_Port 10 of the destination storage apparatus 4 carries out a fabric login to the third fabric 11 (Step S93).

The fabric selector 35 executes the port login and the process login on behalf of the host 1. Specifically, the proxy N_Port 24 of the inter fabric router 2 issues a PLOGI request and a PRLI request to the N_Port 10 of the destination storage apparatus 4, and the proxy N_Port 24 processes a response from the N_Port 10 of the destination storage apparatus 4 (Step S94).

The fabric selector 35 receives a switchover trigger the same as in S2 (Step S95).

The fabric selector 35 switches the coupling destination of the persistent proxy N_Port 22 from the second fabric 9 (F_B) to the third fabric 11 (F_C) the same as in S3 (Step S96).

Lastly, the host 1 requests an IO processing retry for an IO request and a data transfer that were not executed while the inter fabric router 2 was processing the frame routing path switchover (Step S97).

The host 1 has a timer for all the SCSI commands. Therefore, the host 1 in able to detect a command timeout and retry the IO processing. As a different method, the N_Port 6 of the host 1 is able to recognize that all the SCSI tasks that the N_Port 6 of the host 1 was in the process of executed have been cancelled by the N_Port 10 of the destination storage apparatus 4 returning a Unit Attention SCSI response to the SCSI command that was sent to the destination storage apparatus 4 first. In response to having received the Unit Attention SCSI response, the N_Port 6 of the host 1 is able to rapidly re-execute the SCSI command without waiting for a timeout.

Being configured like this, this example also achieves the same effects as the first example. In addition, in this example, the N_Port 6 of the host 1 snoops and holds information in a case where a port login and a process login are carried out with respect to the source N_Port 8 of the source storage apparatus 3. Then, in this example, the proxy N_Port 24 executes processing related to the PLOGI and the PRLI with respect to the N_Port 10 of the destination storage apparatus 4 on behalf of the N_Port 6 of the host 1. Therefore, in this example, the minimum switchover procedures simply take place for a routing-related change only, making it possible to complete a migration process in an even shorter time than in the first example.

EXAMPLE 3

Figure 21:
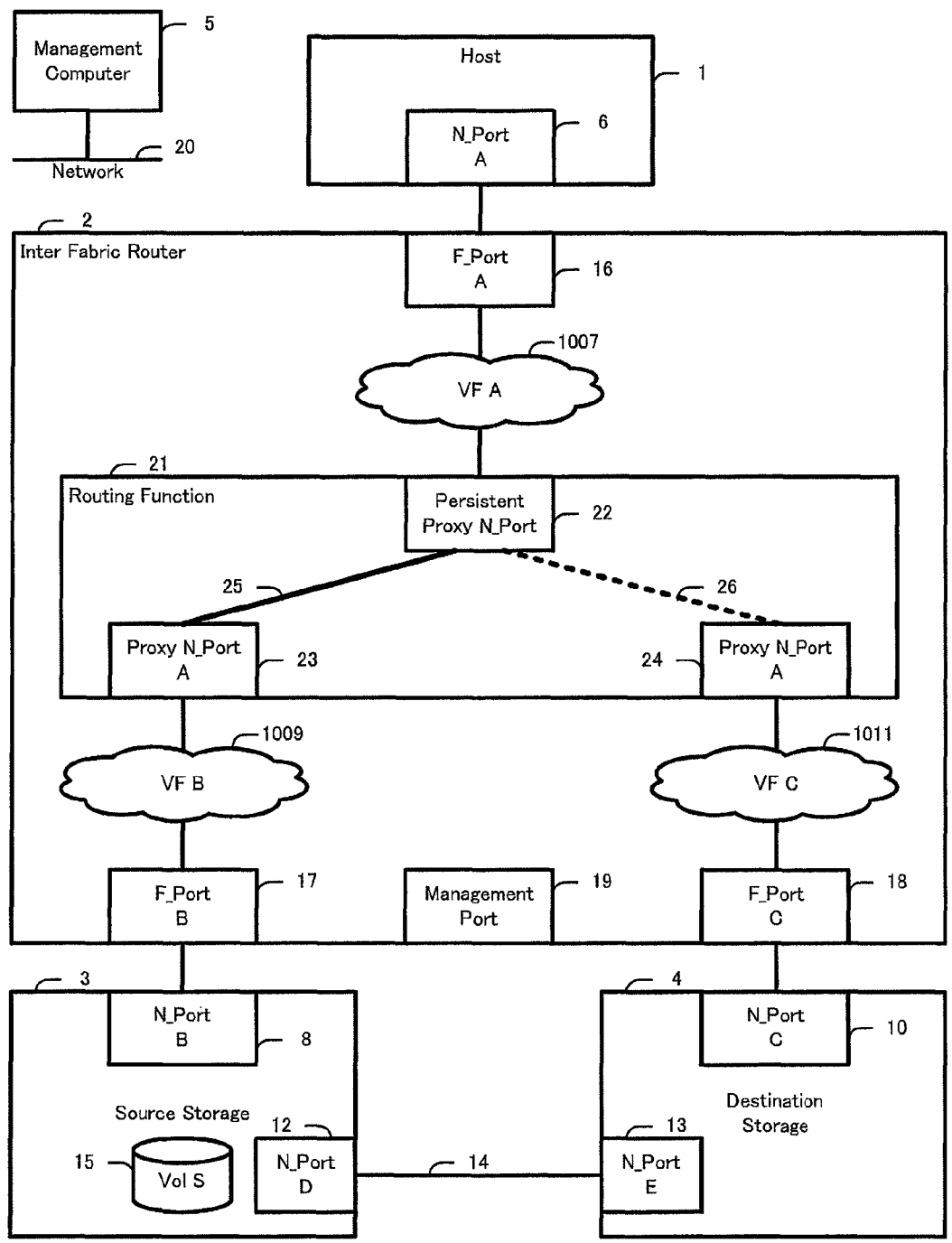
FIG. 21 is a diagram showing the entire system of a third example.

FIG. 21 shows the entire system of a third example. The explanation will focus on the differences with FIG. 1. In FIG. 1, a case in which the fabric has an FC switch was explained. In this example, a switching function comprising virtual fabrics (VF) 1007, 1008, 1009 is disposed inside the inter fabric router 2.

The VF 1007, 1008 and 1009 are logical fabrics capable of being identified by virtual fabric tag (VFT) headers and virtual fabric identifiers (VF_ID). The routing function 21 of this example carries out an operation by combining a VF_ID as an identifier in addition to an F_ID.

EXAMPLE 4

Figure 22:
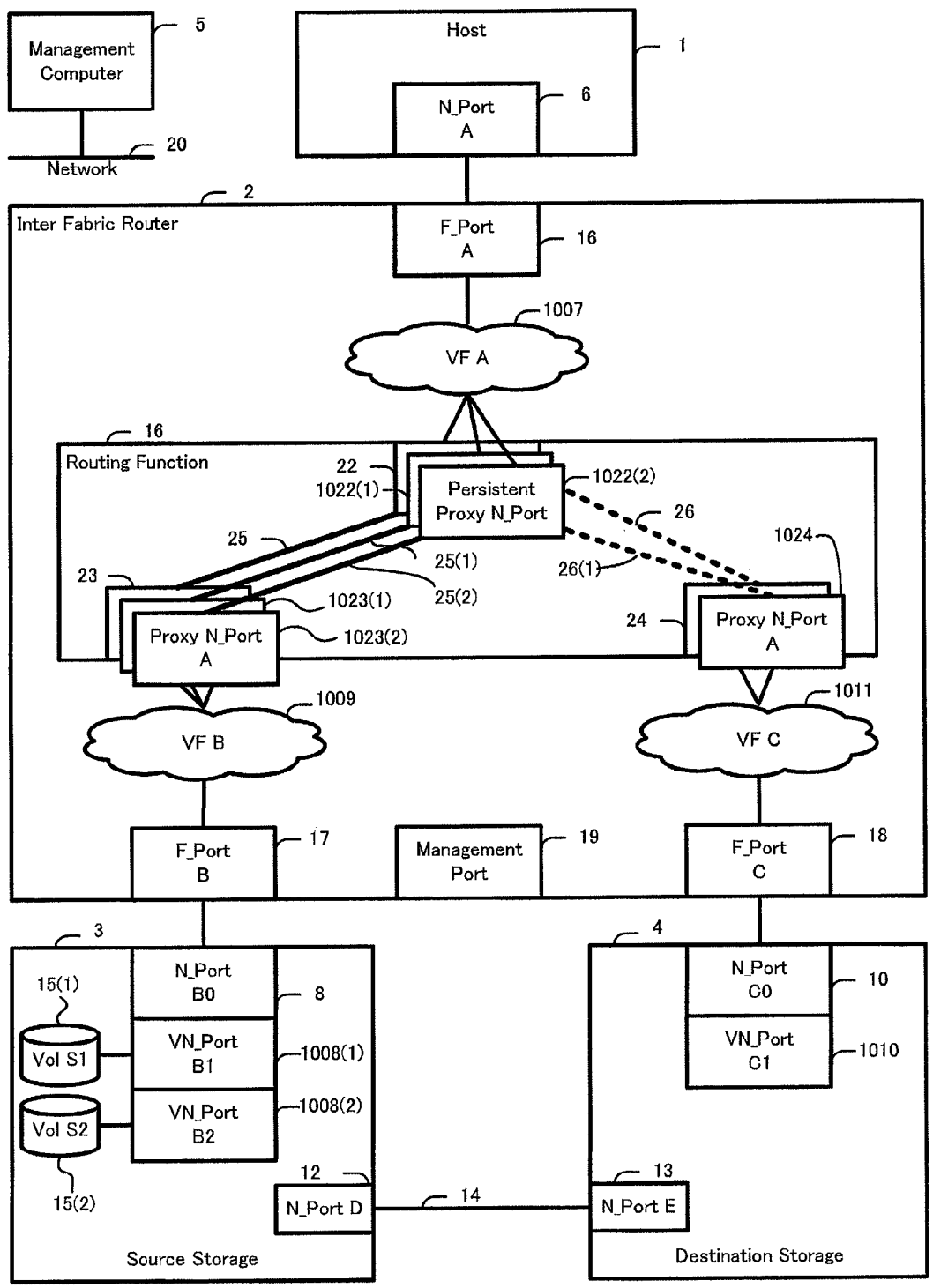
FIG. 22 is a diagram showing the entire system of a fourth example.

FIG. 22 shows the entire system of a fourth example. Since FIG. 22 resembles FIG. 21, the explanation will focus on the differences. This example depicts the state of a case in which the N_Ports 8, 10 of the storage apparatuses 3, 4 create instances of multiple virtual N_Ports (VN_Port) 1008(1), 1008(2) in the physical N_Port 8 of the source storage 3, and multiple virtual N_Ports (VN_Port) 1010 in the physical N_Port 10 of the destination storage 3 by N_Port ID virtualization (NPIV).

In this example, it is possible to migrate a port to the destination storage apparatus 4 in relation solely to a migration-targeted logical volume by associating the VN_Port of the storage apparatus with the migration-targeted logical volume. In the example of FIG. 22, a logical volume 15(1) corresponds to the VN_Port 1008(1), and a logical volume 15(2) corresponds to the VN_Port 1008(2). This example shows a case in which only volume S1 15(1) migrates to the destination storage 4 and volume S2 15(2) does not migrate. Therefore, the VN_Port C1 1010 is logged in to the fabric using the WWPN of the VN_Port B1 1008(1).

The persistent proxy N_Port 22 is coupled to the proxy N_Port 23 via the path 25. Similarly, the persistent proxy N_Port 1022(1) is coupled to the proxy N_Port 1023(1) via the path 25(1). Similarly, the persistent proxy N_Port 1022(2) is coupled to the proxy N_Port 1023(2) via the path 25(2). These paths 25, 25(1), 25(2) are depicting a pre-switchover state in FIG. 22, and show a routing-enabled state. With regards to the relationship of the actual N_Ports being pointed to by the proxy N_Ports, the proxy N_Port 23 points to the N_Port B08, the proxy N_Port 1023(1) points to the N_Port B1 1008(1), and the proxy N_Port 1023(2) points to the N_Port B2 1008(2), respectively.

The persistent proxy N_Port 22 is coupled to the proxy N_Port 24 via the path 26 in a standby state relationship. Similarly, the persistent proxy N_Port 1022(1) is coupled to the proxy N_Port 1024 via the path 26(1). The paths 26, 26(1) indicated by these wavy lines depict a pre-switchover state in FIG. 22, and show a routing-disabled state. With regards to the relationship of the actual N_Ports being pointed to by the proxy N_Ports, the proxy N_Port 24 points to the N_Port C0 10, the proxy N_Port 1024 points to the N_Port C1 1010, respectively.

In a case where the logical volume 15(1) is migrated to the destination storage apparatus 4, only the VN_Port 1008(1) has to be migrated to the destination storage apparatus 4. Similarly, in a case where the logical volume 15(2) is migrated to the destination storage apparatus 4, only the VN_Port 1008(2) has to be migrated to the destination storage apparatus 4.

The persistent proxy N_Port 22 and the proxy N_Ports 23, 24 of the inter fabric router 2 create instances proportional to the number of VN_Ports of the storage apparatus. In the example of FIG. 22, the inter fabric router 2 comprises the persistent proxy N_Port 1022 and the proxy N_Ports 1023(1), 1023(2) and 1024 in addition to the persistent proxy N_Port 22 and the proxy N_Ports 23, 24. In this example, since the number of ports simply increases but the basic operation is the same as the first example, the explanation will be omitted.

Figure 23:
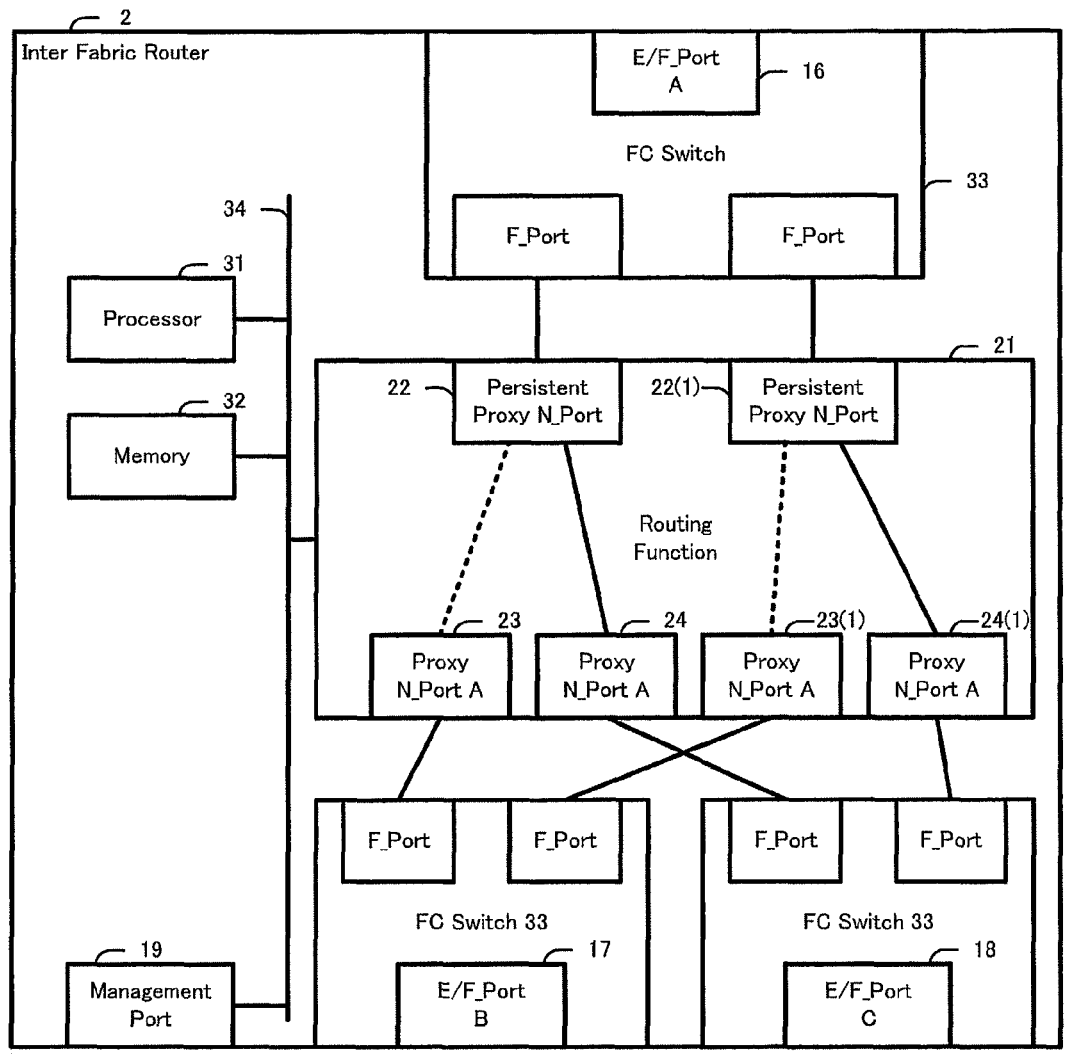
FIG. 23 is a diagram showing the status of a routing function 21 in a case where a login was performed for multiple ports in FIG. 22.

FIG. 23 shows the logical model of the inter fabric router 2 of the fourth example. In FIG. 23, in accordance with a persistent proxy N_Port 22(1) being added to the configuration of FIG. 2 to form a pair, the number of coupling relationships with the front-end FC switches 33 for expanding the internal coupling relationship for coupling to fabric B and fabric C simply increases. Therefore, with the exception that FIG. 23 is a plural form of FIG. 2, FIG. 23 and FIG. 2 are the same and the explanation will be omitted.

EXAMPLE 5

Figure 24:
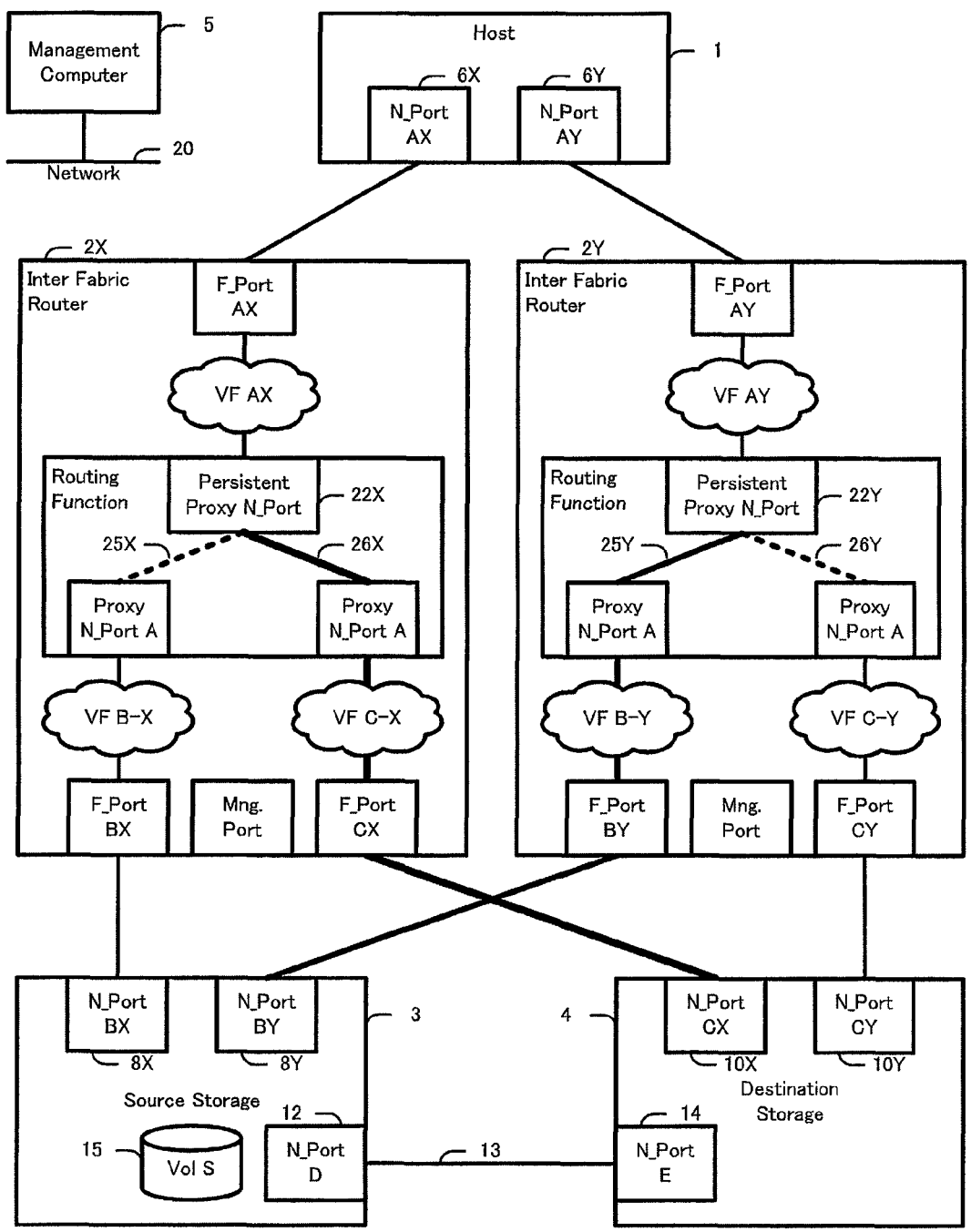
FIG. 24 is a diagram showing the entire system of a fifth example in which a network has been made redundant.

A fifth example will be explained by referring to FIGS. 24 and 25. FIG. 24 shows an entire system in which the network has been made redundant. In order to make the configuration shown in FIG. 21 into the redundant-network configuration shown in FIG. 24, two inter fabric router 2 systems are disposed in this example. In addition, the N_Ports of the host 1 and the storage apparatuses 3 and 4 have also been set up with two systems each for redundancy. Hereinafter, the two systems will be called system X and system Y.

In the first example through the fourth example, control with respect to a single inter fabric router 2 has been explained. In contrast to this, in this example, two inter fabric routers 2X and 2Y operate cooperatively. In a case where the inter fabric routers 2X and 2Y do not cooperatively switch the routing path, there is the likelihood that the host 1 will be able to access both the source logical volume 15 and the destination logical volume 15 via either the inter fabric router 2X or 2Y. In a case where access is possible to both the source logical volume in the source storage apparatus 3 and the destination logical volume in the destination storage apparatus 4, the data stored in the logical volumes loses its integrity.

For example, when a switchover is made from a frame routing path 25X to a frame routing path 26X in the inter fabric router 2X, the frame routing path 25X could conceivably remain selected as-is in the inter fabric router 2Y. In this case, the host 1 is able to access the logical volume 15 via both a N_Port 10X of the source storage apparatus 3 and a N_Port 8Y of the destination storage apparatus 4. Therefore, appropriate processing is required for a switchover-in-progress state. The processing with respect to this switchover-in-progress state will be explained below using FIG. 25.

Figure 25:
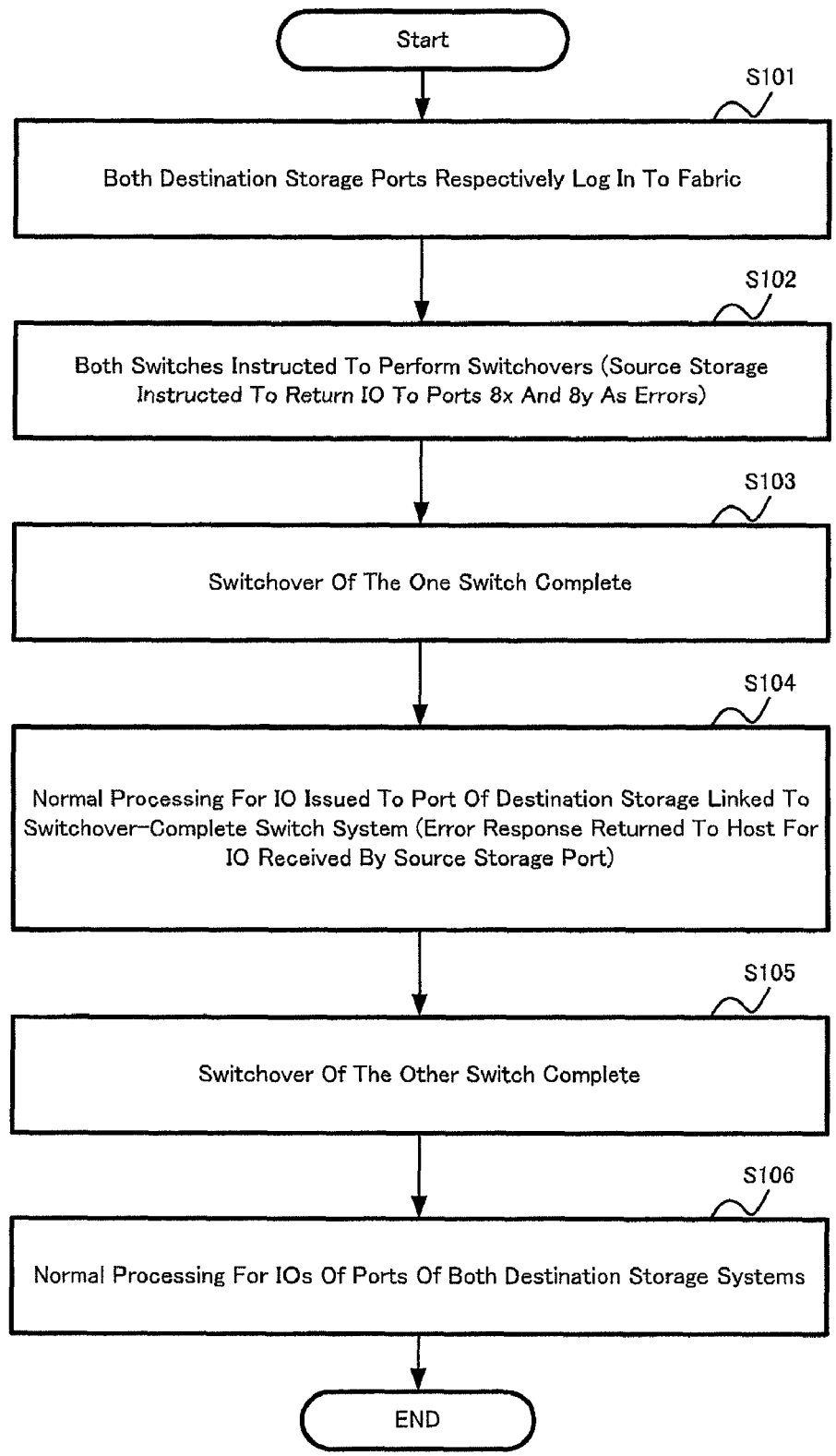
FIG. 25 is a flowchart of a storage migration process in a redundant-network system.

FIG. 25 is a flowchart of a storage migration process in a redundant-network system.

First, the N_Ports 10X and 10Y of the destination storage apparatus 4 respectively log in to the coupling-destination fabric (Step S101).

The switchover instruction source respectively sends switchover instructions to the inter fabric routers 2X and 2Y (Step S102). Since examples of the types of switchover instruction sources and the switchover instruction-issuing triggers were described in the first example, details thereof will be omitted.

When a switchover instruction is issued, the source storage apparatus 3 is instructed to return IO requests to ports 8X and 8Y as errors to the host 1 (Step S102). Therefore, subsequent to receiving the switchover instruction, the source storage apparatus 3 returns an error to the host 1 upon receiving an IO request from the host 1 for the migration-targeted logical volume 15.

The one inter fabric router 2X of the inter fabric routers 2X and 2Y completes the switchover process (Step S103). The other inter fabric router 2Y does not complete the switchover process.

The host 1 issues an IO request using a N_Port 6X. This IO request is routed to the N_Port 10X of the destination storage apparatus 4, which participates in the fabric of the frame routing path 26X of the inter fabric router 2X in which the switchover was completed (Step S104).

In addition, the host 1 is able to issue another IO request using a N_Port 6Y. The other IO request is routed to a N_Port 8Y of the source storage apparatus 3, which participates in the fabric of the frame routing path 25Y of the inter fabric router 2Y in which switchover processing is in progress. However, in response to the switchover process, both the N_Ports 8X and 8Y of the source storage apparatus 3 return error responses to the host 1 to the effect that a switchover is in progress without processing this IO request (Step S104).

The other inter fabric router 2Y of the inter fabric routers 2X and 2Y completes the switchover process (Step S105).

Lastly, the host 1 re-issues the other IO request using the N_Port 6Y. This IO request is routed to the N_Port 10Y of the destination storage apparatus 4, which participates in the fabric of the frame routing path 26Y of the inter fabric router 2Y. The destination storage apparatus 4 processes the received host 1 IO request normally (Step S106).

Furthermore, as a variation of this example, it is also possible to use information for maintaining data consistency so that different multiple IO requests using the logical volume 15 can be simultaneously processed across the source storage apparatus 3 and the destination storage apparatus 4. In the case of a configuration in which information for maintaining data consistency is exchanged as needed between the source storage apparatus 3 and the destination storage apparatus 4, it is also possible to process an IO request using the N_Ports 8X and 8Y of the source storage apparatus 3 while a switchover is in progress.

In a case where the network configuration has been made redundant as in this example, the switches of the prior art can be replaced with the inter fabric routers 2X and 2Y of this example in order one at a time without suspending the system (without cancelling the issuing of an IO request from the host 1). Then, as described above, a migration can be carried out from the source storage apparatus 3 to the destination storage apparatus 4 at the point in time at which the redundant network has provided the inter fabric routers 2X and 2Y of this example.

EXAMPLE 6

In the respective examples explained hereinabove, examples in which only the WWPN is migrated when migrating a storage apparatus port were explained. However, in order to transparently migrate a port of the source storage apparatus to the destination storage apparatus with respect to the host 1, management information, such as INQUIRY information, reservation information, SCSI target port group information, and security information-related SCSI device encryption, which is held by either the logical volume or the SCSI port of the source storage apparatus, must be migrated at the same time. Although not explained in the respective examples described above, it is possible to migrate the above-mentioned management information as-is to the destination storage apparatus in a timely manner.

EXAMPLE 7

An error process in a case where an inter fabric router 2 switchover has failed will be explained. In a case where an inter fabric router 2 switchover process has failed, the processing implemented in the switchover procedure is rolled back. Specifically, the status of the routing table 36 of the routing function 21 is returned to the pre-switchover state, and the routing path is returned to the original frame routing path 25. Furthermore, a notification to the effect that the storage apparatus port migration process has failed is issued to the management computer 5 via the management network 20, and processing is returned to the pre-migration state.

Figure 26:
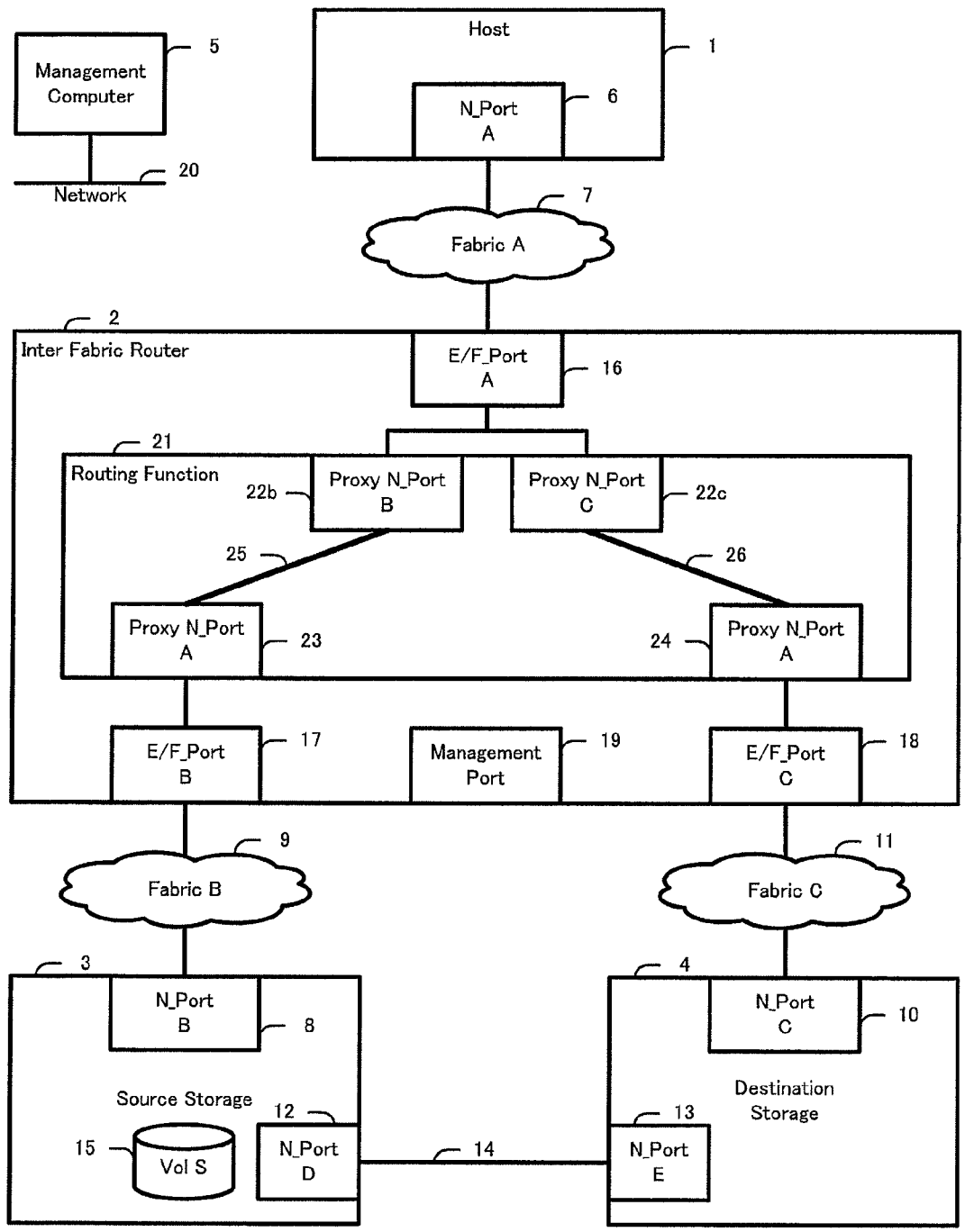
FIG. 26 is a diagram comparing FIG. 1A with an inter fabric router of the prior art.

FIG. 26 is a comparison of a block diagram of a conventional inter fabric router with that of FIG. 1. As shown in FIG. 26, in the past, a N_Port B8-pointer proxy N_Port 22B that belongs to a fabric A7, and a N_Port C10-pointer proxy N_Port 22C that belongs to the fabric A7 had to have different N_Port IDs in order to exist in the same fabric A7 at the same time. For this reason, for the two N_Ports, i.e., proxy N_Port 22B and proxy N_Port 22C, to exist in the prior art, the host 1 must be aware of the fact that an IO issued to the proxy N_Port 22B be sent to the proxy N_Port 22C at switchover time. However, in the FIG. 1, an IO simply has to be issued to the same persistent proxy N_Port 22 subsequent to the switchover as well using the methods for changing routing of FIGS. 3 through 8, and there is no need to issue a change notification to the fabric 7. That is, the persistent proxy N_Port 22 of FIG. 1 makes it possible to transparently realize a storage apparatus migration with respect to the host 1 without changing either the N_Port ID or the WWPN.

Furthermore, the present invention is not limited to the embodiment described hereinabove. A person with ordinary skill in the art will be able to make various additions or changes without departing from the scope of the present invention.

For example, the present invention can be understood as a switch. This switch, for example, may be expressed as follows.

"A switch, which couples a first fabric in which a host computer participates to either one of a second fabric in which a source storage apparatus participates, or a third fabric in which a destination storage apparatus participates, separates the second fabric and the third fabric, and is coupled to a management computer via a management network, wherein, in a case that satisfies the conditions, (1) a state in which the same port name identifier that has been set in the source port of the source storage apparatus is set in the destination port of the destination storage apparatus by the management computer, (2) the destination port is logged in to the third fabric, and (3) in addition, the migration-target logical volume in the source storage apparatus is migrated from the source storage apparatus to the destination storage apparatus, switches from a first state, in which the first fabric and the second fabric are coupled and the third fabric is decoupled, to a second state, in which the first fabric and the third fabric are coupled and the second fabric is decoupled when a switchover is instructed."

REFERENCE SIGNS LIST

1 Host
2 Inter fabric router
3 Source storage apparatus
4 Destination storage apparatus
5 Management computer
7 First fabric in which a host participates
9 Second fabric in which a source storage apparatus participates
11 Third fabric in which a destination storage apparatus participates
21 Routing function
22 Persistent proxy N_Port
23, 24 Proxy N-Ports
31 Control processor
32 Memory
33 FC switch
35 Fabric selector
36 Routing table
37 Port login information
39 Zoning information

The invention claimed is:

1. A control method of a computer system, which comprises a host computer that participates in a first fabric, a source storage apparatus that participates in a second fabric, a destination storage apparatus that participates in a third fabric, a management computer that is coupled via a management network to the host computer, the source storage apparatus and the destination storage apparatus, and a switch that controls couplings among the first fabric, the second fabric and the third fabric, the switch being configured so as to separately manage the second fabric and the third fabric, and to couple the first fabric to either the second fabric or the third fabric, the control method of a computer system executing:

a setting step of setting a same port name identifier as a port name identifier that has been set in a source port of the source storage apparatus in a destination port of the destination storage apparatus using the management computer;

a login step of causing the destination port to log in to the third fabric; a volume migration step of migrating a migration-target logical volume from the source storage apparatus to the destination storage apparatus; and a switchover step of switching the switch, to which a switchover instruction, has been issued, from a first state, in which the first fabric and the second fabric are coupled and the third fabric is decoupled, to a second state, in which the first fabric and the third fabric are coupled and the second fabric is decoupled.

2. A control method of a computer system according to claim 1, wherein a cancellation step of cancelling processing of an IO (Input Output) request, which the source storage apparatus has received from the host computer, is executed between the volume migration step and the switchover step, and subsequent to the switchover from the first state to the second state in the switchover step, a retry step of causing the host computer to reissue the IO request that has been cancelled in the cancellation step, is executed.

3. A control method of a computer system according to claim 2, wherein the switch comprises a first port, which is coupled to a port of the host computer via the first fabric, a second port, which is coupled to the source port via the second fabric, a third port, which is coupled to the destination port via the third fabric, a table that manages identifiers for identifying a coupling-destination port for each of the first port, the second port and the third port, and a selection status for showing either the second fabric or the third fabric has been selected, and a computer program for rewriting the table in a case where the switchover has been instructed, and wherein, in the switchover step, the first state is switched to the second state by the computer program rewriting the table.

4. A control method of a computer system according to claim 3, wherein, prior to the login step, the port of the host computer executes a step of carrying out a port login and a process login with respect to the source port of the source storage apparatus, and a step of acquiring information related to a port login and a process login a port login and a process login and holding the acquired information in the switch, and subsequent to the login step, the third port executes a proxy login step of carrying out a port login and a process login with respect to the destination port on behalf of the port of the host computer using the information related to the port login and the process login held in the switch.

5. A control method of a computer system according to claim 4, wherein
the source storage apparatus and the destination storage apparatus are coupled via an inter-apparatus communication path that is disposed separately from the fabrics and the management network, and
in the volume migration step, the logical volume is migrated from the source storage apparatus to the destination storage apparatus via the inter-apparatus communication path.

6. A control method of a computer system according to claim 5, wherein, in the volume migration step, the destination storage apparatus mounts the logical volume via the inter-apparatus communication path, and in the retry step, the destination storage apparatus transfers the IO request reissued from the host computer to the source storage apparatus via the inter-apparatus communication path, and causes the IO request to be executed by the source storage apparatus and returns the result of this processing to the host computer.

7. A control method of a computer system according to claim 6, wherein, subsequent to the retry step, data of the logical volume is copied to the logical volume in the destination storage apparatus via the inter-apparatus communication path, and the IO request from the host computer is processed using the logical volume in the destination storage apparatus.

8. A control method of a computer system according to claim 7, wherein
the host computer comprises two ports,
the switch comprises a first switch, which is coupled to one of the ports of the host computer, and a second switch, which is coupled to the other port of the host computer, and
the first switch and the second switch are each coupled to the management computer, the source port and the destination port.

9. A control method of a computer system according to claim 1, wherein the switchover instruction the switchover instruction source which instructs the switch to perform the switchover is either the source storage apparatus or the destination storage apparatus, which has taken the initiative in a migration of the logical volume.

10. A control method of a computer system according to claim 1, wherein the switchover instruction is issued to the switch by the source storage apparatus logging out from the second fabric.

11. A control method of a computer system according to claim 1, wherein the volume migration step and the switchover step are executed in accordance with an instruction from either the host computer or the management computer.

12. A computer system comprising:
a host computer that participates in a first fabric;
a source storage apparatus that participates in a second fabric;
a destination storage apparatus that participates in a third fabric;
a management computer that is coupled via a management network to the host computer, the source storage apparatus and the destination storage apparatus; and
a switch that controls couplings among the first fabric, the second fabric and the third fabric, wherein the switch is configured so as to separately manage the second fabric and the third fabric, and to couple the first fabric to either the second fabric or the third fabric,
the management computer sets a same port name identifier as a port name identifier that has been set in a source port of the source storage apparatus in a destination port of the destination storage apparatus,
the destination storage apparatus logs in to the third fabric prior to a switchover instruction being issued to the switch,
a migration-target logical volume in the source storage apparatus is migrated from the source storage apparatus to the destination storage apparatus prior to the switchover instruction being issued to the switch,
and
the switch, when the switchover instruction is issued, switches from a first state, in which the first fabric and the second fabric are coupled and the third fabric is decoupled, to a second state, in which the first fabric and the third fabric are coupled and the second fabric is decoupled.

13. A computer system according to claim 12, wherein subsequent to the logical volume having been migrated from the source storage apparatus to the destination storage apparatus, and prior to the switchover instruction being issued to the switch, the source storage apparatus cancels processing of an IO (Input Output) request which has been received from the host computer,
the host computer reissues the cancelled IO request subsequent to the switchover from the first state to the second state by the switch, and the destination storage apparatus processes the reissued IO request using the migrated logical volume.

14. A computer system according to claim 13, wherein
the switch comprises a first port, which is coupled to a port of the host computer via the first fabric,
a second port, which is coupled to the source port via the second fabric,
a third port, which is coupled to the destination port via the third fabric,
a table that manages identifiers for identifying a coupling-destination port for each of the first port, the second port and the third port, and a selection status for showing either the second fabric or the third fabric has been selected, and
a computer program for rewriting the table in a case where the switchover has been instructed, and when the switchover is instructed, the first state is switched to the second state by the computer program rewriting the table.

15. A computer system according to claim 14, wherein
the switch, in a case where a port of the host computer carries out a port login and a process login with respect to the source port of the source storage apparatus, acquires and holds information related to the port login and the process login, and
subsequent to the destination storage apparatus having logged in to the third fabric, the third port carries out a port login and a process login with respect to the destination port on behalf of the port of the host computer using the information related to the port login and the process login.

* * * * *